United States Patent
Usui et al.

(10) Patent No.: US 9,777,719 B2
(45) Date of Patent: Oct. 3, 2017

(54) FUEL PUMP WITH DISCHARGE CONTROL

(75) Inventors: Takashi Usui, Toyota (JP); Takeshi Kitamura, Toyota (JP); Hirokazu Yokoyama, Toyota (JP); Yoshihiro Tanaka, Aichi-ken (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 597 days.

(21) Appl. No.: 13/503,187

(22) PCT Filed: Oct. 12, 2010

(86) PCT No.: PCT/IB2010/002585
§ 371 (c)(1),
(2), (4) Date: Apr. 20, 2012

(87) PCT Pub. No.: WO2011/048456
PCT Pub. Date: Apr. 28, 2011

(65) Prior Publication Data
US 2012/0207632 A1 Aug. 16, 2012

(30) Foreign Application Priority Data
Oct. 22, 2009 (JP) .................................. 2009-243573

(51) Int. Cl.
*F04B 39/08* (2006.01)
*F04B 39/10* (2006.01)
(Continued)

(52) U.S. Cl.
CPC ....... *F04B 39/1073* (2013.01); *F02M 59/366* (2013.01); *F02M 59/462* (2013.01);
(Continued)

(58) Field of Classification Search
CPC ....... F01L 3/205; F01L 25/08; F04B 39/0016; F04B 39/0027; F04B 39/08;
(Continued)

(56) References Cited

U.S. PATENT DOCUMENTS 3,070,022 A 12/1962 McCormack
4,089,348 A 5/1978 Yoshida et al.
(Continued)

FOREIGN PATENT DOCUMENTS

CN 1206792 A 2/1999
EP 0 894 972 A2 2/1999
(Continued)

OTHER PUBLICATIONS

Japanese Office Action for corresponding JP Patent Application No. 2009-243573 with a drafting date of Apr. 25, 2012.
(Continued)

*Primary Examiner* — Patrick Hamo
(74) *Attorney, Agent, or Firm* — Sughrue Mion, PLLC

(57) ABSTRACT

In a fuel pump that includes a pump housing (10) that has fuel passages (11a, 11b), a plunger (17) that is movably housed in the pump housing (10), a fuel pressurizing chamber (15) that is formed in the pump housing (10) and draws in fuel via one of the fuel passages (11a) that is on the intake side of the fuel pressurizing chamber (15), pressurizes the fuel that has been drawn in, and discharges the pressurized fuel via the other fuel passage (11b) that is on the discharge side of the fuel pressure chamber (15), in response to movement of the plunger (17), and valve elements (12, 14, 16) that are arranged in the fuel passages (11a, 11b) near the fuel pressurizing chamber (15), each of the valve elements (12, 14, 16) has a reed valve body (41, 42, 43; 74, 75, 76) arranged in the fuel passage (11a) on the intake side of the fuel pressurizing chamber (15) or the fuel passage (11b) on the discharge side of the fuel pressurizing chamber (15); and an operating member (21) that applies operating force in at least one of a valve opening direction or a valve closing direction to the reed valve body (41, 42, 43; 74, 75, 76) is provided in the pump housing (10).

16 Claims, 14 Drawing Sheets

(51) Int. Cl.
  *F02M 59/36* (2006.01)
  *F02M 59/46* (2006.01)
  *F02M 63/00* (2006.01)
  *F04B 1/04* (2006.01)
  *F04B 7/00* (2006.01)
  *F04B 53/10* (2006.01)
  *F16K 15/16* (2006.01)
  *F16K 15/18* (2006.01)
  *F02M 63/02* (2006.01)

(52) U.S. Cl.
  CPC ........ *F02M 59/464* (2013.01); *F02M 59/466* (2013.01); *F02M 63/005* (2013.01); *F04B 1/0465* (2013.01); *F04B 7/0076* (2013.01); *F04B 53/1037* (2013.01); *F16K 15/16* (2013.01); *F16K 15/185* (2013.01); *F02M 63/0265* (2013.01)

(58) Field of Classification Search
  CPC .............. F04B 39/1047; F04B 39/1066; F04B 39/1073; F04C 29/128; F16K 15/14; F16K 15/18
  USPC ....... 417/297, 298, 506, 510, 560, 561, 563; 137/855, 856, 857, 858, 522
  See application file for complete search history.

(56) References Cited

U.S. PATENT DOCUMENTS

| | | | |
|---|---|---|---|
| 4,290,455 A * | 9/1981 | Honda et al. | 137/855 |
| 5,575,309 A * | 11/1996 | Connell | F16K 31/082 |
| | | | 137/554 |
| 5,967,488 A * | 10/1999 | Redlich | 251/129.2 |
| 6,575,718 B2 * | 6/2003 | Onishi et al. | 417/571 |
| 6,893,233 B2 * | 5/2005 | Hong | 417/569 |
| 7,014,433 B2 * | 3/2006 | Nieter | F04B 39/1066 |
| | | | 137/855 |
| 7,059,344 B2 * | 6/2006 | Shibamoto et al. | 417/569 |
| 7,497,230 B1 * | 3/2009 | Hawkins et al. | 137/512.4 |
| 7,726,951 B2 * | 6/2010 | Jansen et al. | 417/270 |
| 2003/0095881 A1 | 5/2003 | Hong | |
| 2006/0147317 A1 * | 7/2006 | Okamoto | F02D 41/3845 |
| | | | 417/297 |
| 2007/0178529 A1 | 8/2007 | Breidford et al. | |

FOREIGN PATENT DOCUMENTS

| | | |
|---|---|---|
| EP | 0894972 A2 | 2/1999 |
| EP | 1 541 942 A2 | 6/2002 |
| FR | 704 918 A | 5/1931 |
| GB | 1 219 762 A | 1/1971 |
| JP | 57-008958 U | 1/1982 |
| JP | 59-51262 U | 4/1984 |
| JP | 4-4574 U | 1/1992 |
| JP | 9-250427 A | 9/1997 |
| JP | 11-107875 A | 4/1999 |
| JP | 11-132131 A | 5/1999 |
| JP | 2001-153000 A | 6/2001 |
| JP | 2001-355542 A | 12/2001 |
| JP | 2002-061548 A | 2/2002 |
| JP | 2002-070694 A | 3/2002 |
| JP | 2002-221069 A | 8/2002 |
| JP | 2003-120563 A | 4/2003 |
| JP | 2005-009531 A | 1/2005 |
| JP | 2007-146861 A | 6/2007 |
| JP | 2009-203987 A | 9/2009 |

OTHER PUBLICATIONS

Japanese Office Action for corresponding JP Patent Application No. 2009-243573 drafted Sep. 16, 2011.

International Search Report and Written Opinion for corresponding International Patent Application PCT/IB2010/002585 mailed Feb. 8, 2011.

* cited by examiner

FUEL PUMP WITH DISCHARGE CONTROL

BACKGROUND OF THE INVENTION

1. Field of the Invention

The invention relates to a fuel pump that pressurizes fuel for an internal combustion engine to a high pressure and then discharges it. More particularly, the invention relates to a plunger pump in which a valve that controls the flow and pressure of fuel is provided near a fuel pressurizing chamber of the plunger pump.

2. Description of the Related Art

Recently, among internal combustion engine for vehicles, so-called direct-injection types that inject fuel directly into the cylinders, even with spark-ignition systems, have become popular. Of these, some attempt to increase output by increasing the intake air amount by cooling the intake air through the vaporization heat of fuel injected into the cylinders during the intake stroke, and improve combustion stability during startup with semi-stratified combustion achieved by injecting fuel into the cylinders during the compression stroke.

In these type of internal combustion engines, compared with when the fuel is injected into the intake port, the fuel must be pressurized to a high pressure and then delivered to a fuel injection valve (i.e., a fuel injector), so a plunger type high pressure fuel pump is often used as the fuel pump.

Japanese Patent Application Publication No. 11-132131 (JP-A-11-132131), for example, describes one such fuel pump according to related art. The fuel pump described is a plunger pump that has a check valve that opens when the pressure on the fuel pressurizing chamber side is low provided in an intake side fuel passage that draws fuel into a fuel pressurizing chamber of the plunger pump. This check valve serves to prevent pulsations in the pressure of the fuel that is pressurized in the fuel pressurizing chamber, and also prevent hydraulic hammer caused by those pulsations from reaching the low pressure side. It is also known that this check valve is not limited to being a ball valve with little fuel intake resistance; it may also be a reed valve that can easily be made small.

Moreover, a fuel pump is also known (see Japanese Patent Application Publication No. 2001-355542 (JP-A-2001-355542), for example) that attempts to reduce the size of intake side and discharge side reed valves by forming both an intake side reed valve body and an discharge side reed valve body in the same valve plate, and forming intake side and discharge side valve seat holes that are opened and closed by these reed valve bodies in seat plates located on opposite sides of the valve plate, and controls the discharge amount and discharge pressure of fuel with the required accuracy by opening and closing an annular through-hole formed through the center portions of the valve plate and the seat plates with an electromagnetic spill valve.

Meanwhile, in a diesel engine, fuel injection with better fuel atomization and great penetrating force (i.e., in which the fuel particles travel far) is required, so a plunger pump capable of producing higher pressure is used for the fuel pump. However, in this case as well, a fuel pump in which an electromagnetic spill valve is provided near the fuel pressurizing chamber to control the discharge amount and discharge pressure of fuel is often used (see Japanese Patent Application Publication No. 2002-61548 (JP-A-2002-61548), for example).

In the related fuel pumps such as those described above, a check valve or a valve with that function must be provided on both the intake side and the discharge side. In recent years, however, relief valves or the like that limit the discharge pressure to a set pressure have also started to be housed in fuel pumps, so there is a need to consolidate functions in the fuel line.

However, when a plurality of valves are housed in a fuel pump in this way, and each of these valves is formed with a valve body, a valve seat, a spring, a guide, and a stopper, and the like, as a poppet valve or the like is, the number of parts becomes even larger and complicated hole-drilling must be performed on the pump housing, which increases costs.

In contrast, as described in JP-A-2001-355542, the number of parts and the amount of work on the pump housing can be reduced if the check valves on the intake side and the discharge side are formed by reed valves.

However, even in this case, the annular through-hole in the valve plate and the seat plates acts as a spillway for controlling the discharge amount and discharge pressure of the fuel and is opened and closed by a poppet valve type electromagnetic spill valve, which results in an increase in the number of parts and requires high precision valve seat hole drilling just the same, so costs are unable to be sufficiently reduced. Documents GB-A-1 219 762, EP 0 894 972 A2, US 2007/178529 A1, U.S. Pat. No. 3,070,022 and US 2003/095881 A1 disclose a system according to the preamble of the present invention. FR-A-704 918 discloses a mechanically controlled cam system for reducing impact load and enhancing fatigue strength of fins. Further, EP 1 541 942 A2 provides an expansion-type cryogenic refrigerator with a high-performance compressor for very low temperatures.

SUMMARY OF INVENTION

Thus, in view of the problems described above, this invention provides a small, low cost fuel pump that is capable of controlling the discharge amount and discharge pressure.

A first aspect of the invention relates to a fuel pump that includes a pump housing that has fuel passages, a plunger that is movably housed in the pump housing, a fuel pressurizing chamber that is formed in the pump housing and draws in fuel via one of the fuel passages that is on the intake side of the fuel pressurizing chamber, pressurizes the fuel that has been drawn in, and discharges the pressurized fuel via the other fuel passage that is on the discharge side of the fuel pressure chamber, in response to movement of the plunger, and valve elements that are arranged in the fuel passages near the fuel pressurizing chamber. In this fuel pump, each of the valve elements has a reed valve body arranged in the fuel passage on the intake side of the fuel pressurizing chamber or the fuel passage on the discharge side of the fuel pressurizing chamber. Also, an operating member that applies operating force in at least one of a valve opening direction or a valve closing direction to the reed valve body is provided in the pump housing.

According to this structure, the discharge amount and the discharge pressure can be controlled by the reed valve by operating the reed valve body with the operating member. Therefore, it is no longer necessary to manufacture a high precision poppet valve body and valve seat hole and the like. Accordingly, a small, low cost fuel pump capable of controlling the discharge amount and discharge pressure is able to be provided.

In the fuel pump described above, the reed valve body may have a valve body portion that opens part of the fuel passage by being displaced in the valve opening direction and closes part of the fuel passage by being displaced in the valve closing direction, and a flexible arm portion that has one end portion that is connected to the valve body portion and another end portion that is supported by the pump housing. Also, the flexible arm portion may have a thin portion that is thinner in the displacement direction of the valve body portion than the valve body portion.

According to this structure, the required rigidity against the pushing load of the operating member can be ensured with the valve body portion, while the valve body portion of the reed valve body is able to be easily displaced in the valve opening direction and the valve closing direction by the flexible arm portion, so even if the valve is arranged in the fuel passage on the intake side, it is able to be a reed valve with little intake resistance. Incidentally, the reed valve is a cantilever structure, so reducing the plate thickness cubes the increase in the amount of deflection, thus it is more effective than making the flexible arm portion longer and narrower. Further, the reed valve can be made to have even less intake resistance by combining these.

Also, in the fuel pump described above, a concave portion that is adjacent to the flexible arm portion and opens toward a seat plate that is adjacent to one surface side of a valve plate formed of an elastic plate may be formed on the reed valve body, such that a gap is formed between the seat plate and the flexible arm portion of the reed valve body.

According to this structure, so-called fretting wear can reliably be prevented from occurring, so the durability of the reed valve body can be increased.

Also, in the fuel pump described above, a valve seat portion that surrounds a portion of the fuel passages may be provided inside the pump housing. Further, one side surface portion of the operating member that is away from the other end portion of the flexible arm portion may be guided in the operating direction by the valve seat portion or a guide member on the pump housing side near the valve seat portion.

According to this structure, even if the operating member receives force in a direction orthogonal to the operating direction while the reed valve body is flexed in the valve opening direction as a result of the operating force from the operating member being applied to it, that lateral force is supported by the guide member that guides the one side surface portion of the operating member, so the operating member is able to operate the reed valve body with a stable operating posture.

In the fuel pump described above, a valve plate formed of an elastic plate and a seat plate that is adjacent to one surface side of the valve plate may be housed inside the pump housing. Further, the reed valve body may be formed by a part of the valve plate that has been partially cut out, and parts of the fuel passages may be formed by cutaway portions in the seat plate.

According to this structure, when parts of the fuel passages are formed in the seat plates, the valve seat portions that surround those can be formed at the same time, thus obviating the need to form high precision valve seat portions. As a result, thin reed valves can be easily manufactured.

In the fuel pump described above, the reed valve body may be formed by a first reed valve body arranged in the fuel passage on the intake side of the fuel pressurizing chamber or a second reed valve body arranged in the fuel passage on the discharge side of the fuel pressurizing chamber. Also, the first reed valve body and the second reed valve body are each formed by a part of the valve plate that has been partially cut out, and a part of the fuel passage on the intake side of the fuel pressurizing chamber and a part of the fuel passage on the discharge side of the fuel pressurizing chamber are each formed by a cutaway portion in the seat plate.

According to this structure, the plurality of reed valve bodies are formed in the valve plate, while the valve seat portions that correspond to the plurality of reed valve bodies and parts of the fuel passages are formed on and in the seat plates. As a result, the plurality of reed valves can be made compact.

In the fuel pump described above, a third reed valve body that opens one of the fuel passages, from among the fuel passage on the intake side of the fuel pressurizing chamber and the fuel passage on the discharge side of the fuel pressurizing chamber, by being displaced in the valve opening direction and closes the one fuel passage by being displaced in the valve closing direction may be formed, separate from the first reed valve body and the second reed valve body, by a part of the valve plate that has been partially cut out. Also, the third reed valve body may be closer to the second reed valve body or the first reed valve body arranged in the one fuel passage than to the first reed valve body or the second reed valve body arranged in the other fuel passage, from among the fuel passage on the intake side of the fuel pressurizing chamber and the fuel passage on the discharge side of the fuel pressurizing chamber.

According to this structure, the reed valve that is arranged in the fuel passage on the intake side of the fuel pressurizing chamber is away from the rest of the reed valves that are arranged in the fuel passage on the discharge side of the fuel pressurizing chamber, so the seal on the high pressure and low pressure sides is able to be maintained.

In the fuel pump described above, the first reed valve body may form an intake valve that has a check valve function and is arranged in the fuel passage on the intake side of the fuel pressurizing chamber, the second reed valve body may form a discharge valve that has a check valve function and is arranged in the fuel passage on the discharge side of the fuel pressurizing chamber, and the third reed valve body may form a relief valve that is connected to the fuel passage on the discharge side of the fuel pressurizing chamber.

According to this structure, a fuel pump that consolidates functions by housing the relief valve, in addition to the intake valve and the discharge valve, inside the pump housing is easily able to be smaller.

In the fuel pump described above, a concave portion that opens toward the reed valve body may be formed on the seat plate such that a gap is formed between the reed valve body and the flexible arm portion.

According to this structure, fretting wear can be prevented even if a concave portion is not provided on the reed valve body side, so the reed valve body is easier to manufacture, which enables costs to be reduced.

In the fuel pump described above, a concave surface having a cross section that is curved in an arc shape may be formed on an operated portion of the reed valve body that receives operating force from the operating member. Also, the reed valve body may be structured such that, when the reed valve body flexes upon receiving operating force front the operating member, the reed valve body receives the operating force from the operating member at a contact point located on the innermost side of the concave surface in the direction of the operating force.

According to this structure, when the reed valve body flexes, lateral force that acts to offset the operating member in the direction orthogonal to the operating direction can be suppressed, so the required operating precision and operating stability can be ensured. Incidentally, the concave surface with a cross section that is curved in an arc-shape is, for example, part of a cylindrical surface or a spherical surface, and includes a concave surface resembling either of the two.

Also, in the fuel pump described above, a valve seat portion that surrounds a portion of the fuel passages may be provided inside the pump housing. Further, the reed valve body may have a valve body portion that opens part of the fuel passage by being displaced to so as to move away from the valve seat portion and closes part of the fuel passage by being displaced so as to engage with the valve seat portion, and a flexible arm portion that has one end portion that is connected to the valve body portion and another end portion that is supported by the pump housing. Also, the valve body portion may form an annular sloped surface that is sloped in a generally conical shape and forms a convex shape in the valve closing direction toward the valve seat portion. The valve body portion may be configured to be urged against the valve seat portion while the flexible arm portion is flexed, when the valve body portion engages with the valve seat portion.

According to this structure, a good seal when the valve is closed can be stably ensured.

In the fuel pump described above, the valve seat portion may have an annular seat surface corresponding to the annular sloped surface of the valve body portion. Also, the reed valve body may be formed from a plate spring member that forms the flexible arm portion and part of the valve body portion that is integrally formed with the flexible arm portion, and a fixing member that is fixed to the plate spring member and forms the remaining portion of the valve body portion.

According to this structure, extremely durable plate spring material can be used for the flexible arm portion of the reed valve body and the like, so the durability of the reed valve and the seal when the reed valve is closed can be improved.

Meanwhile, in the fuel pump described above, a first elastic plate and a second elastic plate that face one another may be housed inside the pump housing. Also, the reed valve body may be formed by a first reed valve body arranged in the fuel passage on the intake side of the fuel pressurizing chamber or a second reed valve body arranged in the fuel passage on the discharge side of the fuel pressurizing chamber. Further, one reed valve body, from among the first reed valve body and the second reed valve body, and part of the fuel passage on the discharge side of the fuel pressurizing chamber or the fuel passage on the intake side of the fuel pressurizing chamber, whichever fuel passage corresponds to the other reed valve body, from among the first reed valve body and the second reed valve body, may be formed by a part of the first elastic plate that has been partially cut out and a cutaway portion in the first elastic plate, respectively. Also, part of the fuel passage on the intake side of the fuel pressurizing chamber or the fuel passage on the discharge side of the fuel pressurizing chamber, whichever fuel passage corresponds to the one reed valve body, from among the first reed valve body and the second reed valve body, and the other reed valve body may be formed by a cutaway portion in the second elastic plate and a part of the second elastic plate that has been partially cut out, respectively.

Accordingly, even if the valve opening directions (or valve closing directions) of the plurality of reed valves differ from one another, the reed valve bodies and the valve seat portions can be easily formed in and on the two layers of elastic plates, so a thin valve structure can be realized.

Accordingly, the fuel pump of the invention is able to be a small fuel pump that is cable of controlling the discharge amount and discharge pressure by providing the reed valve body and the operating member that operates this reed valve body. In addition, there is no need to manufacture a high precision poppet valve body and valve seat hole and the like. As a result, a small, low cost fuel pump capable of controlling the discharge amount and discharge pressure can be provided.

BRIEF DESCRIPTION OF DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the present invention will be described in greater detail below with reference to the accompanying drawings. FIGS. 1 to 4 show a fuel pump according to a first example embodiment of the invention.

Incidentally, the fuel pump of this example embodiment is a plunger pump type high pressure fuel pump that draws in, pressurizes, and then discharges fuel for an engine such as an in-cylinder injection or dual injection type gasoline engine (hereinafter, simply referred to as "engine") mounted in a vehicle, according to the structure described below.

Figure 2:
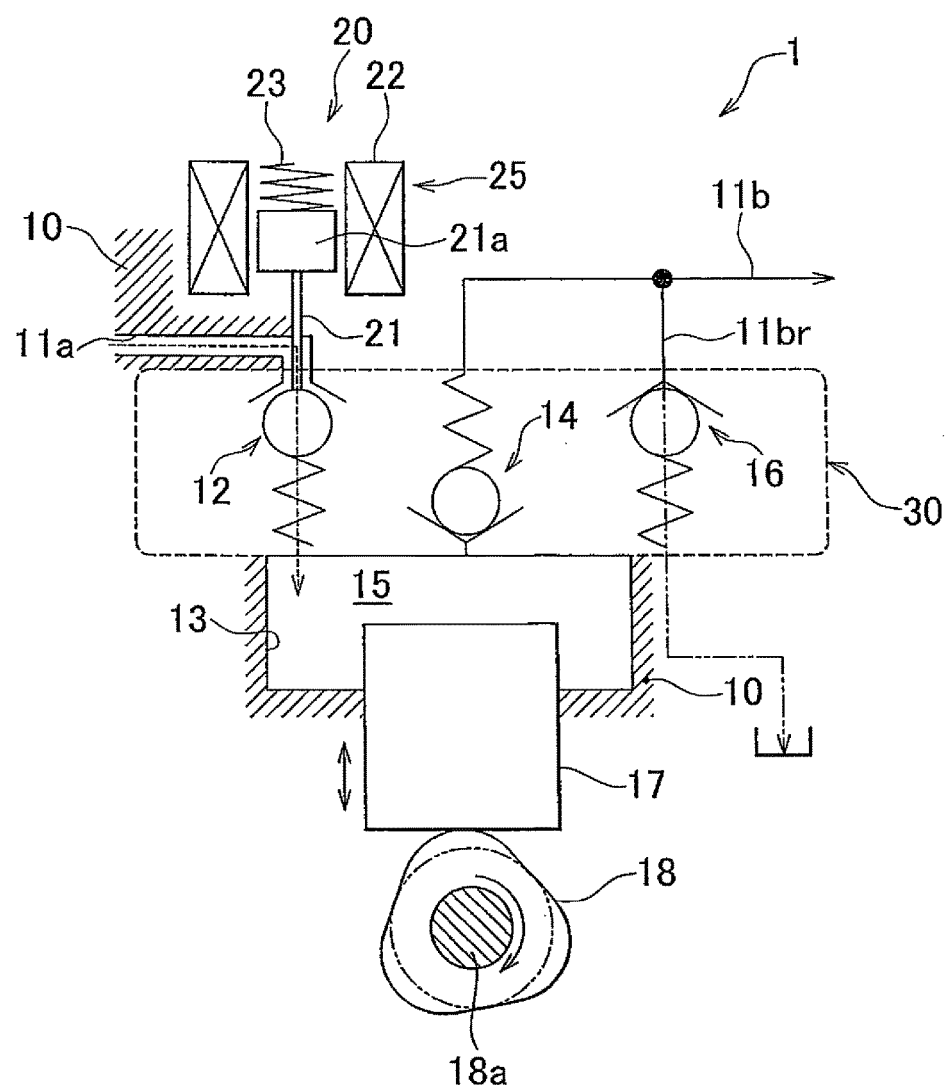
FIG. 2 is a block diagram schematically showing the fuel pump according to the first example embodiment, with the valve unit which is the main portion being denoted with hydraulic circuit symbols.

As schematically shown by the block diagram in FIG. 2, this fuel pump 1 is provided with a pump housing 10 (not shown in detail) that has a fuel passage 11a on the intake side (i.e., an intake passage), a fuel passage 11b on the discharge side (i.e., a discharge passage), and an internal space 13 that is communicated with both the fuel passage 11a and the fuel passage 11b.

A plunger 17 is housed so as to be able to slide in the axial direction, in the pump housing 10 such that a fuel pressurizing chamber 15 that is communicated with the intake side fuel, passage 11a and the discharge side fuel passage 11b is formed between the plunger 10 and the pump housing 10. A drive cam 18 that drives this plunger 17 is also provided in the pump housing 10. A rotating shaft portion 18a of the drive cam 18 protrudes outside of the pump housing 10 at one end side and is rotatably driven by the power of the engine via a pulley.

Also, an intake valve 12 that functions as a check valve that is positioned in the intake side fuel passage 11a, and a discharge valve 14 that functions as a check valve that is positioned in the discharge side fuel passage 11b are provided inside the pump housing 10.

The intake valve 12 opens at least when fuel is delivered at a first fuel pressure level from a feed pump, not shown, to the intake side fuel passage 11a (in this example embodiment, the intake valve 12 is normally open, which will be described later), thus enabling fuel to be drawn into the fuel pressurizing chamber 15 through the intake side fuel passage 11a. Also, when the intake valve 12 is closed and the lift amount of the plunger 17 increases by the rotation of the drive cam 18, the volume of the fuel pressurizing chamber 15 decreases. With this decrease, the fuel inside the fuel pressurizing chamber 15 becomes pressurized to a second fuel pressure level that is sufficiently higher than the first fuel pressure level, i.e., the supply pressure level of the feed pump.

When closed, the discharge valve 14 prevents the high pressure fuel on the delivery pipe side from flowing back into the fuel pressurizing chamber 15 when fuel is being drawn in. Also, when the pressure of the fuel in the fuel pressurizing chamber 15 becomes higher than the pressure of the fuel in the discharge side fuel passage 11b downstream of this discharge valve 14 and the difference between those pressures (i.e., the differential pressure) reaches a preset differential pressure value, the discharge valve 14 opens such that the high pressure fuel in the fuel pressurizing chamber 15 can be discharged to the side with a delivery pipe, not shown, that is connected to the discharge side fuel passage 11b on the downstream side.

A relief valve 16 is also provided in the pump housing 10. This relief valve 16 opens when the pressure of the high pressure fuel discharged from the fuel pressurizing chamber 15 to the delivery pipe side reaches a preset upper limit pressure value, so as to enable the excess fuel to flow back to the fuel tank side.

Incidentally, although not shown in detail here, the feed pump draws up fuel such as gasoline stored in a fuel storage tank when driven by the rotative power of the engine. Also, the delivery pipe accumulates and stores high pressure fuel discharged from the fuel pump 1 and distributes (i.e., supplies) that high pressure fuel to a plurality of in-cylinder injection fuel injection valves (not shown) mounted in the cylinders of the engine when those fuel injection valves are open.

In the fuel pump 1 of this example embodiment, the intake valve 12, the discharge valve 14, and the relief valve 16 described above are integrated as a valve unit 30 that will be described next, and this valve unit 30 is arranged in a position near the fuel pressurizing chamber 15 and fixed at an outer peripheral portion to the inside of the pump housing 10. Therefore, the intake valve 12, the discharge valve 14, and the relief valve 16 are each valve elements that are arranged near the fuel pressurizing chamber 15.

Figure 1:
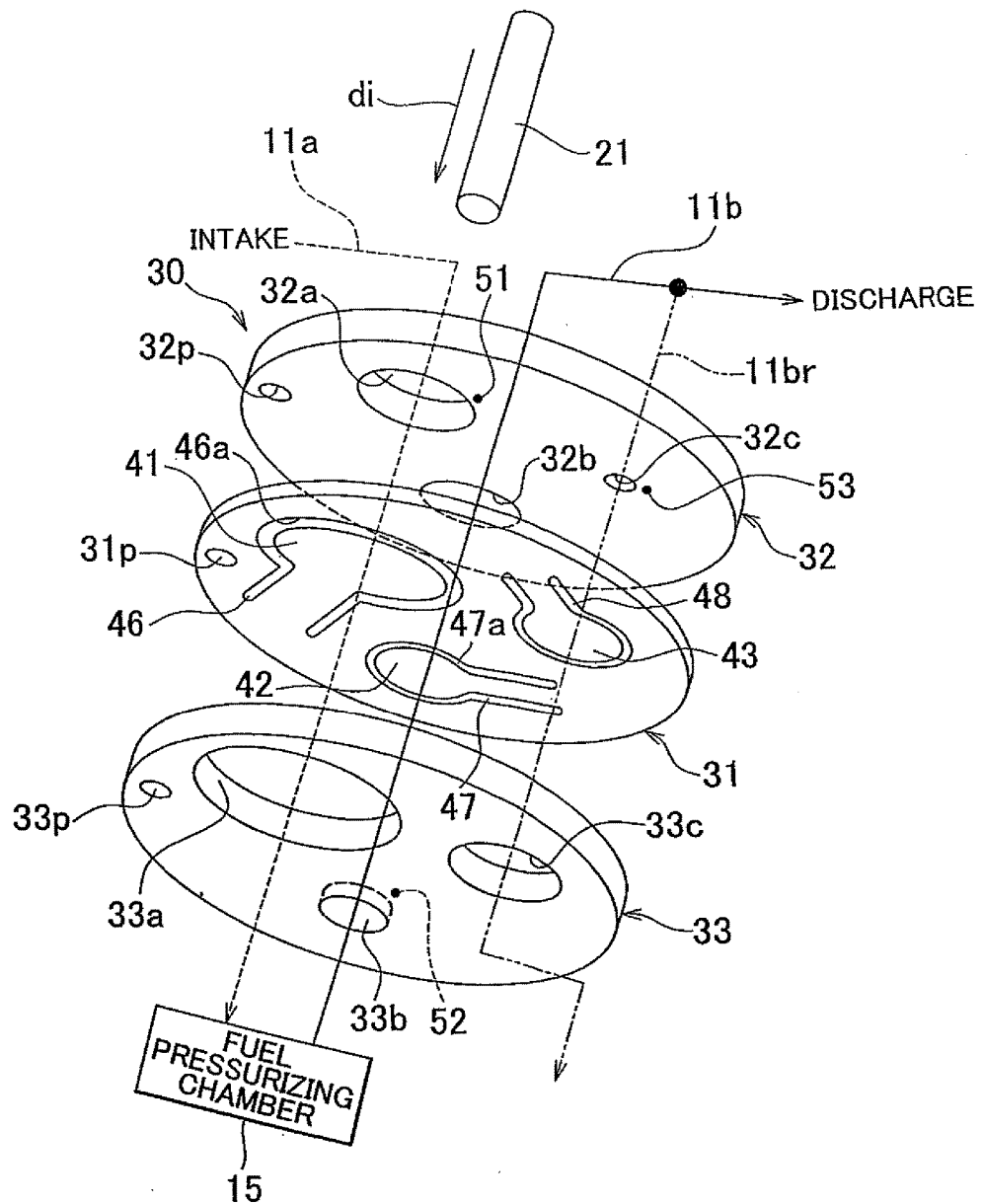
FIG. 1 is an exploded perspective view of a main portion of a fuel pump according to a first example embodiment of the invention.

As shown in FIG. 1, the intake valve 12, the discharge valve 14, and the relief valve 16 of the valve unit 30 are each formed by a reed valve arranged in the intake side fuel passage 11a or discharge side fuel passage 11b of the fuel pressurizing chamber 15. The valve unit 30 has a first reed valve body 41 and a first valve seat portion 51 that correspond to the intake valve 12, a second reed valve body 42 and a second valve seat portion 52 that correspond to the discharge valve 14, and a third reed valve body 43 and a third valve seat portion 53 that correspond to the relief valve 16.

More specifically, the valve unit 30 has a generally discoid valve plate 31 housed in the pump housing 10, one seat plate 32 that is adjacent to one side (one surface) of the valve plate 31, and another seat plate 33 that is adjacent to the other side (the other surface) of the valve plate 31. The first reed valve body 41, the second reed valve body 42, and the third reed valve body 43 are integrally formed in the valve plate 31. Also, the first valve seat portion 51 and the third valve seat portion 53 are integrally formed in the one seat plate 32 on the side that faces the valve plate 31, and the second valve seat portion 52 is integrally formed in the other seat plate 33 on the side that faces the valve plate 31.

Here, the valve plate 31 is an elastic plate with good spring properties that is made of precipitation hardened stainless steel plate, for example. The plate thickness of this valve plate 31 is approximately 1 mm, for example. This valve plate 31 is manufactured to have a discoid outer peripheral profile shape by precision press working (other manufacturing methods such as electrical discharge machining (EDM) or wire cutting are also possible), for example. In this press working process or another process, cutout grooves 46, 47, and 48 are formed by partially cutting away a portion of a constant width around the first reed valve body 41, the second reed valve body 42, and the third reed valve body 43, respectively, and a positioning hole 31p is bored near the outer peripheral portion of this plate valve 31.

The one seat plate 32 is made from plate material having a hardness (i.e., the hardness of the valve seat portion) equivalent to that of the valve plate 31, such as a metal plate that is thicker than the valve plate 31. This one seat plate 32 is manufactured to have a discoid outer peripheral profile shape by precision press working (other manufacturing methods such as electrical discharge machining (EDM) or wire cutting are also possible), for example. In this press working process or another process, hole portions are cut out to form a passage hole 32a that becomes part of the intake side fuel passage 11a radially inward of the first valve seat portion 51, a passage hole 32b that has an opening area wide enough to surround the second reed valve body 42 and the annular portion 47a of the cutout groove 47 and forms the upstream end portion of the discharge side fuel passage 11b, and a passage hole 32c that becomes part of the discharge side fuel passage 11b radially inward of the third valve seat portion 53 (in this case, part of a return passage portion 11br that branches off to relieve excess pressure), and a positioning hole 32p is bored near the outer peripheral portion of the one seat plate 32.

Also, the other seat plate 33 is made of plate material having a hardness equivalent to that of the valve plate 31 and the one seat plate 32. This other seat plate 33 is also manufactured to have a discoid outer peripheral profile shape by precision press working (other manufacturing methods such as electrical discharge machining (EDM) or wire cutting are also possible), for example. In this press working process or another process, hole portions are cut out to form a passage hole 33a that forms the downstream end portion of the intake side fuel passage 11a, a passage hole 33b that becomes part of the discharge side fuel passage 11b radially inward of the second valve seat portion 52, and a passage hole 33c that becomes part of a fuel return passage to the fuel tank side of the relief valve 16, and a positioning hole 33p is bored near the outer peripheral portion of this other seat plate 33. Here, the passage hole 33a of the other seat plate 33 opens to the fuel pressurizing chamber 15 side with an opening area wide enough to surround the first reed valve body 41 and the annular portion 46a of the cutout groove 46.

The positioning hole 31p of the valve plate 31, the positioning hole 32p of the one seat plate 32, and the positioning hole 33p of the other seat plate 33 have generally the same hole diameter. Thus, the valve plate 31, the one seat plate 32, and the other seat plate 33, are able to be placed in the necessary relative positions by guiding them at their outer peripheral portions, concentrically stacking them together and then inserting a positioning pin into the positioning holes 31p, 32p, and 33p.

Figure 3A:
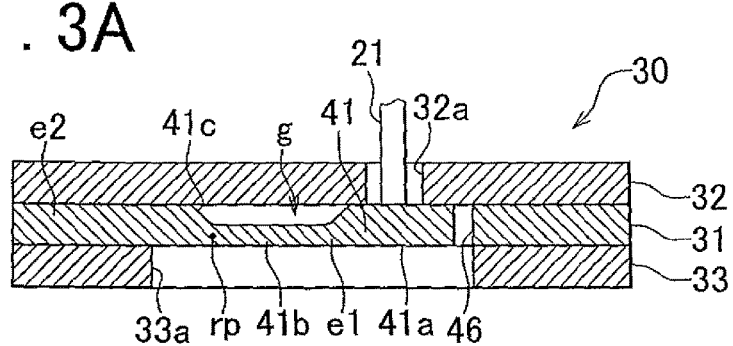
FIG. 3A is a sectional view of an intake valve portion of the valve unit of the fuel pump according to the first example embodiment when the intake valve portion is closed.

As shown in FIG. 3A, the first reed valve body 41 has a valve body portion 41a that opens part of the fuel passage 11a by being displaced in a valve opening direction in which it moves away from the first valve seat portion 51, and closes part of the fuel passage 11a by being displaced in a valve closing direction in which it abuts against the first valve seat portion 51, and a flexible arm portion 41b that is connected to this valve body portion 41a. This flexible arm portion 41b is integrally connected to the valve body portion 41a at one end portion e1 and is supported by the pump housing 10 via the one seat plate 32 and the other seat plate 33 at the other end portion e2. Also, the flexible arm portion 41b has a thin portion rp that is thinner in the displacement direction of the valve body portion 41a (i.e., in the vertical direction in FIG. 3A) than the valve body portion 41a in the middle portion in the length direction. This thin portion rp of the flexible arm portion 41b may be made thin during manufacturing such as during press working when the first reed valve body 41 is formed in the valve plate 31 and then heat treated when necessary, or it may be made thin by electric discharge machining or the like.

The valve body portion 41a of the first reed valve body 41 has a generally circular (i.e., discoid) shape, for example, and the flexible arm portion 41b of the first reed valve body 41 has a strip-like sheet shape that is narrower than the diameter (i.e., the greatest width) of the valve body portion 41a. Also, the first valve seat portion 51 that faces the valve body portion 41a of the first reed valve body 41 has a generally circular shape. Similarly, the valve body portion of the second reed valve body 42 and the valve body portion of the third reed valve body 43 (neither of which are denoted by a reference character) both have generally circular shapes. The flexible arm portion of the second reed valve body 42 and the flexible arm portion of the third reed valve body 43 (neither of which are denoted by a reference character) each have strip-like sheet shapes that are narrower than the diameter (i.e., the greatest width) of the valve body portion. Also, the second valve seat portion 52 and the third valve seat portion 53 that face the valve body portions of the second reed valve body 42 and the third reed valve body 43, respectively, both have generally circular shapes.

The base end side of the flexible arm portion 41b of the first reed valve body 41 is positioned farther to the outer peripheral side of the valve plate 31 than the center of the valve body portion 41a. Similarly, the base end side of the flexible arm portion of the second reed valve body 42 is positioned farther to the outer peripheral side of the valve plate 31 than the center of the valve body portion of the second reed valve body 42, and the base end side of the flexible arm portion of the third reed valve body 43 is positioned farther to the outer peripheral side of the valve plate 31 than the center of the valve body portion of the third reed valve body 43. Also, the base end sides of the flexible arm portions 41b and the like each face one side in the circumferential direction, and the valve body portions 41a and the like each face the other side in the circumferential direction.

In this example embodiment, in this way, the reed valve body that serves as the valve body of the intake valve 12 is formed by the first reed valve body 41 arranged in the intake side fuel passage 11a of the fuel pressurizing chamber 15, and the reed valve that serves as the valve body of the discharge valve 14 is formed by the second reed valve body 42 arranged in the discharge side fuel passage 11b of the fuel pressurizing chamber 15. Also, the first reed valve body 41 and the second reed valve body 42 are each formed by a part of the valve plate 31 that has been partially cut out.

Also, the passage hole 32a that forms part of the intake side fuel passage 11a and the passage hole 32b that forms part of the discharge side fuel passage 11b are each formed by a part of the one seat plate 32 that has been cut out.

Aside from the first reed valve body 41 and the second reed valve body 42 as described above, the third reed valve body 43 that opens and closes the passage hole 32c that forms part of the discharge side fuel passage 11b is also formed by a part of the valve plate 31 that has been partially cut out. However, this third reed valve body 43 is closer to the second reed valve body 42 that is arranged in the discharge side fuel passage 11b than it is to the first reed valve body 41 that is arranged in the intake side fuel passage 11a of the fuel pressurizing chamber 15. Incidentally, the phrase "closer to" in this case means that any portion from the base end of the third reed valve body 43 that is integrally supported by the valve plate 31 to the free end of the third reed valve body 43 is closer to any portion from the base end of the second reed valve body 42 that is integrally supported by the valve plate 31 to the free end of the second reed valve body 42 than it is to any given portion from the base end of the first reed valve body 41 that is integrally supported by the valve plate 31 to the free end of the first reed valve body 41. That is, the phrase "the third reed valve body 43 is closer to the second reed valve body 42 than it is to the first reed valve body 41" means that, in other words, of the cutout grooves 46, 47, and 48, the distance between the cutout groove 46 through which fuel on the low pressure side passes and the cutout grooves 47 and 48 through which the fuel on the high pressure side passes at the closest portions is greater than the distance between the cutout grooves 47 and 48 at the closest portions.

Furthermore, a concave portion 41c that is adjacent to the flexible arm portion 41b along the entire width (i.e., in the direction orthogonal to the surface of the paper on which FIG. 3A is drawn) of the flexible arm portion 41b and opens toward the one seat plate 32 is formed on the first reed valve body 41 such that a gap g is formed between the one seat plate 32 and the thin portion rp of the flexible arm portion 41b of the first reed valve body 41. This concave portion 41c becomes deeper farther from the valve body portion 41a until it reaches the thin portion rp at the end portion e1 side of the flexible arm portion 41b. The depth of this concave portion 41c is constant for a specified length from the valve body portion 41a in which the thin portion rp is formed, and then becomes shallower farther away from the valve body portion 41a. Accordingly, the first reed valve body 41 is thickest at the valve body portion 41a and the other end portion (i.e., the supporting end portion) of the flexible arm portion 41b, which have a thickness that corresponds to the thickness of the one seat plate 32, and becomes thinner nearer the thin portion rp at the portions where the valve body portion 41a and the other end portion (i.e., the supporting end portion) of the flexible arm portion 41b are connected to the thin portion rp.

Meanwhile, an operating member 21 is provided in the pump housing 10. This operating member 21 applies operating force in, the valve opening direction and/or the valve closing direction to the first reed valve body 41 that forms the intake valve 12. For example, the operating member 21 applies positive operating force in the valve opening direction (indicated by arrow di in FIG. 1) (i.e., increases the pressure load in the valve opening direction) and/or applies negative operating force in the valve closing direction (i.e., reduces the pressure load in the valve closing direction).

The upper end portion 21a of the operating member 21 in FIG. 2 serves as an operating plunger portion that is inserted into an electromagnetic coil 22. When the power is turned on such that the electromagnetic coil 22 becomes energized, the operating member 21 is pulled into the electromagnetic coil 22 from the upper end portion 21a side and thus comes away from the valve body portion 41a of the first reed valve body 41.

Also, the upper end portion 21a of the operating portion 21 is urged toward the valve body portion 41a of the first reed valve body 41 by a compression coil spring 23. Thus, when the electromagnetic coil 22 is de-energized, the urging force of the compression coil spring 23 is applied to the valve body portion 41a of the first reed valve body 41 via the operating member 21 so that the valve body portion 41a comes slightly away from the first valve seat portion 51, thereby opening the intake valve 12.

The electromagnetic coil 22 and the compression coil spring 23 form an electromagnetic operating unit 25 that operates the operating member 21. This electromagnetic operating unit 25, together with the operating member 21 and the intake valve 12, forms the electromagnetic spill valve 20. In this example embodiment, the intake valve 12 is a so-called normally open type valve that is open as described above when the electromagnetic operating unit 25 is de-energized.

When the power is turned on such that the electromagnetic coil 22 becomes energized and the operating member 21 is pulled into the electromagnetic coil 22, the pressure in the valve opening direction from the operating member 21 is removed. As a result, the first reed valve body 41 is able to move toward and abut against the first valve seat portion 51 with the elastic recovery of the flexible arm portion 41b. That is, the intake valve 12 can be closed by energizing the electromagnetic coil 22.

The fuel pump 1 is such that, while the lift amount of the plunger 17 is increasing from the rotation of the drive cam 18, an ECU (electronic control unit), not shown, controls the power to the electromagnetic coil 22 (i.e., the energization of the electromagnetic coil 22) to close the intake valve 12 just for the time that it takes to pressurize and discharge the amount of fuel necessary to compensate for a decrease in the amount of fuel in the delivery pipe due to a fuel injection or a drop in the actual fuel pressure. Incidentally, this kind of operation of the fuel pump 1 will be described later.

Incidentally, in order to make the second reed valve body 42 abut against the second valve seat portion 52 at a preset contact pressure, the flexible arm portion of the second reed valve body 42 may be formed bent so that the portion that abuts against the second valve seat portion 52 protrudes freely from the surface of the valve plate 31 toward the other seat plate 33 side. Alternatively, instead of forming the second reed valve body 42 bent, the second valve seat portion 52 may be made to protrude slightly from the surface of the other seat plate 33. Also, in order to make the third reed valve body 43, in which the valve opening direction is opposite that of the second reed valve body 42, abut against the third valve seat portion 53 at a preset pressure, the flexible arm portion of the third reed valve body 43 may be formed bent so that the portion that abuts against the third valve seat portion 53 protrudes freely from the surface of the valve plate 31 toward the one seat plate 32 side. Alternatively, instead of forming the third reed valve body 43 bent, the third valve seat portion 53 may be made to protrude slightly from the surface of the one seat plate 32. In these cases, the one seat plate 32 on one side of the valve plate 31 and the other seat plate 33 on the other side of the valve plate 31 can both be brought closer together so that they squeeze the valve plate 31 to make that the second reed valve body 42 contact the second valve seat portion 52 and the third reed valve body 43 contact the third valve seat portion 53. Further, the high pressure fuel pressure in the valve opening direction is applied to the relief valve 16 from one surface side of the third reed valve body 43 while low pressure of approximately atmospheric pressure is applied to the relief valve 16 from the other surface side of the third reed valve body 43. Therefore, the inside diameter of the third valve seat portion 53 is smaller than that of the second valve seat portion 52 and the flexible arm portion of the third reed valve body 43 does not have a thin portion so the bending rigidity of it is comparatively higher.

Figure 4:
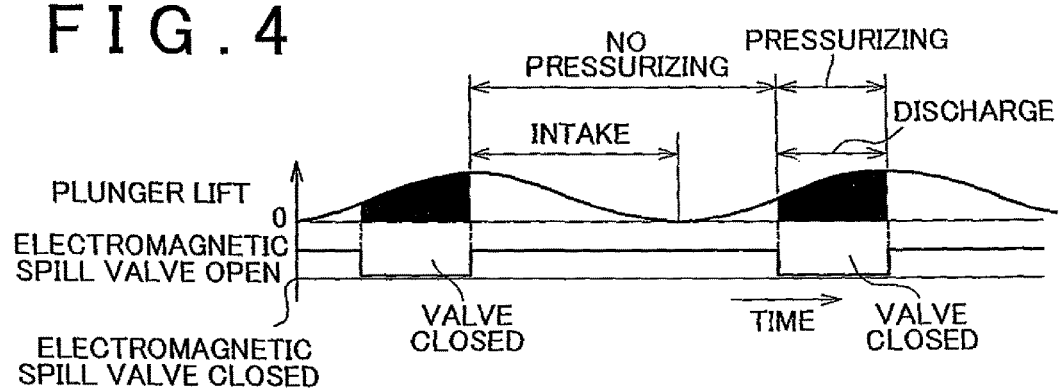
FIG. 4 is a timing chart showing the operation timing of an electromagnetic spill valve formed by the intake valve portion of the valve unit of the fuel pump according to the first example embodiment and an operating mechanism that operates that intake valve portion, as contrasted with the lift change of the plunger.

Next, the operation will be described. While the engine is operating, the drive cam 18 of the fuel pump 1 is driven by the power of the engine. The lift amount of the plunger 17 changes cyclically, as shown in FIG. 4, according to that rotation.

In this state, the amount of fuel needed to compensate for a decrease in the amount of fuel in the delivery pipe due to a fuel injection or a drop in the actual fuel pressure is calculated by the ECU at regular periods. While the lift amount of the plunger 17 is increasing (i.e., while fuel is able to be pressurized), the ECU energizes the electromagnetic coil 22 just for the time that it takes to pressurize and discharge that required amount of fuel. At this time, the operating member 21 is drawn to the electromagnetic coil 22 against the urging force in the valve opening direction of the compression coil spring 23, thus removing the pressure load in the valve opening direction. As a result, the intake valve 12 closes. While the intake valve 12 is closed, the fuel in the fuel pressurizing chamber 15 is pressurized from the first fuel pressure level to a sufficiently high second fuel pressure level (such as 4 to 13 MPa) as the lift amount of the plunger 17 increases and the volume of the fuel pressurizing chamber 15 decreases. When the fuel in the fuel pressurizing chamber 15 reaches this second fuel pressure level, the discharge valve 14 is forced open and the fuel is delivered into the delivery pipe.

On the other hand, during the period when the intake valve 12 is not closed, power to the electromagnetic coil 22 is interrupted by the ECU, so the urging force in the valve opening direction from the compression coil spring 23 acts on the operating member 21 of the electromagnetic operating unit 25 and the pressure from the operating member 21 opens the intake valve 12. While the intake valve 12 is open, even if the volume of the fuel pressurizing chamber 15 decreases due to an increase in the lift amount of the plunger 17 from the rotation of the drive cam 18, the fuel in the fuel pressurizing chamber 15 will simply leak out to the intake side fuel passage 11a side as a result, so the fuel in the fuel pressurizing chamber 15 will not be pressurized to the second fuel pressure level and thus will not be discharged.

During this time, the discharge valve 14 that has the second reed valve body 42 opens when the pressure of the fuel in the fuel pressurizing chamber 15 becomes higher than the pressure of the fuel in the discharge side fuel passage 11b on the downstream side and that differential pressure reaches a preset differential pressure value (such as 60 kPa). Also, the relief valve 16 that has the third reed valve body 43 opens, thus limiting the upper limit of the pressure of the fuel supplied to the delivery pipe side, when the pressure of the high pressure fuel discharged from the fuel pressurizing chamber 15 to the delivery pipe side reaches a preset upper limit pressure value.

In this way, the fuel pump 1 of this example embodiment that includes the valve unit 30 having the intake valve 12, the discharge valve 14, and the relief valve 16, and the electromagnetic operating unit 25 that opens and closes that intake valve 12 consolidates functions by housing the relief valve 16 together with the intake valve 12 and the discharge valve 14 in the pump housing 10, which enables the fuel pump 1 to easily be made smaller. In addition, the period during which the first reed valve body 41 is closed by the operating member 21 of the electromagnetic operating unit 25 can be variably controlled, so the discharge amount and the discharge pressure of the fuel pump 1 can be controlled by the intake valve 12 having the first reed valve body 41. Therefore, it is no longer necessary to manufacture a high precision poppet valve body and valve seat hole and the like, as it is in the related art. Accordingly, a small, low cost fuel pump 1 capable of controlling the discharge amount and discharge pressure is able to be provided.

Also, the first reed valve body 41 in this example embodiment has the thin portion rp where the thickness of the flexible arm portion 41b in the displacement direction of the valve body portion 41a is thinner than the thickness of the valve body portion 41a. As a result, the valve body portion 41a of the first reed valve body 41 is able to be easily displaced in the valve opening direction and the valve closing direction by the flexible arm portion 41b, so the intake valve 12 that is arranged in the intake side fuel passage 11a is able to be a reed valve with little intake resistance. Incidentally, the first reed valve body 41 is a cantilever structure, so reducing the plate thickness by the thin portion rp cubes the increase in the amount of deflection, thus it is more effective than making the flexible arm portion 41b longer and narrower. Of course, the reed valve can be made to have even less intake resistance by combining these. Meanwhile, the first reed valve body 41 has sufficient thickness corresponding to the thickness of the one seat plate 32 at the valve body portion 41a and the other end portion (i.e., the supporting end portion) of the flexible arm portion 41b, and becomes thinner nearer the thin portion rp at the portions where the valve body portion 41a and the other end portion (the supporting end portion) of the flexible arm portion 41b are connected to the thin portion rp. As a result, stress on the base end side of the first reed valve body 41 that is loaded with the most stress can be reduced, and stress can also be prevented from concentrating at the portion where the valve body portion 41a is connected to the flexible arm portion 41b, so sufficient reliability of the intake valve 12 is able to be maintained.

Furthermore, the first reed valve body 41, the second reed valve body 42, and the third reed valve body 43 are each formed by a part of the valve plate 31 that has been partially cut out, and part of the intake side fuel passage 11a and part of the discharge side fuel passage 11b are each formed by a cutaway portion in the one seat plate 32 and the other seat plate 33. Therefore, when part of the intake side fuel passage 11a and part of the discharge side fuel passage 11b are formed in the one seat plate 32 and the other seat plate 33, the first valve seat portion 51, the second valve seat portion 52, and the third valve seat portion 53 that surround those can be formed at the same time, thus obviating the need to form a plurality of high precision valve seat portions. As a result, the valve unit 30 having thin reed valves can be easily manufactured.

In addition, the plurality of reed valve bodies 41 to 43 are formed in the valve plate 31, while the valve seat portions 51 to 53 that correspond to the plurality of reed valve bodies 41 to 43 and the passage holes 32a, 32b, 32c, 33a, 33b, and 33c that form part of the fuel passages are formed on and in the seat plates 32 and 33 that are adjacent to the valve plate 31. As a result, the valve unit 30 having the intake valve 12, the discharge valve 14, and the relief valve 16 (i.e., three reed valves) can be made compact.

Also, the reed valve 41 that is arranged in the intake side fuel passage 11a of the fuel pressurizing chamber 15 is away from the rest of the reed valves 42 and 43 that are arranged in the discharge side fuel passage 11b of the fuel pressurizing chamber 15, so the seal on the high pressure and low pressure sides is able to be maintained.

In addition, in this example embodiment, so-called fretting wear can reliably be prevented from occurring between the first reed valve body 41 and the one seat plate 32, so the durability of the first reed valve body 41 can be increased. That is, with the reverse arrangement in which the flexible arm portion 41b of the first reed valve body 41 is near the one seat plate 32, as shown in FIG. 3C, for example, the flexible arm portion 41b gradually contacts the one seat plate 32 from the base end side of the first reed valve body 41, after which the valve body portion 41a ultimately contacts the one seat plate 32. However, a minute amount of sliding may occur between the two. In this case, it is difficult to remove wear dust between the flexible arm portion 41b of the first reed valve body 41 and the one seat plate 32, and that area is not lubricated, so fretting wear in which wear progresses suddenly and rapidly may occur.

Figure 3B:
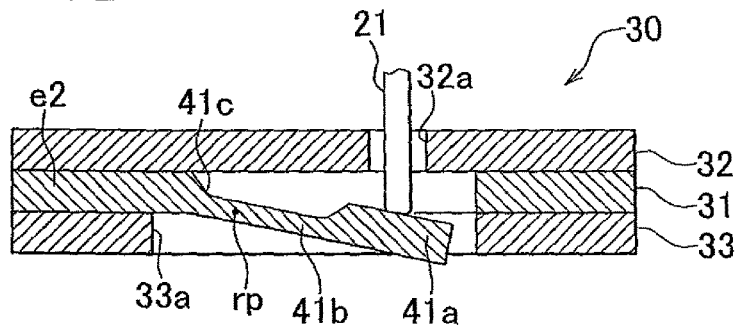
FIG. 3B is a sectional view of the intake valve portion of the valve unit of the fuel pump according to the first example embodiment when the intake valve portion is open.
Figure 3C:
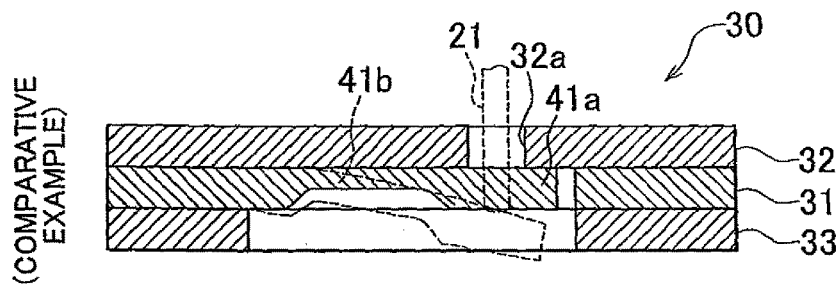
FIG. 3C is a sectional view of an intake valve portion of a valve unit of a fuel pump according to a comparative example with respect to the intake valve portion shown in FIGS. 3A and 3B.

In contrast, as shown in FIGS. 3A and 3B, the concave portion 41c that is adjacent to the flexible arm portion 41b and opens toward the one seat plate 32 is formed in the first reed valve body 41 such that the gap g is formed between the one seat plate 32 and the flexible arm portion 41b of the first reed valve body 41. As a result, fretting wear is able to be reliably prevented from occurring.

In this way, this example embodiment is not only able to provide the small fuel pump 1 that is able to control the discharge amount and the discharge pressure by providing the first reed valve body 41 and the operating member 21 that operates this first reed valve body 41, but also able to obviate the need to form a high precision poppet valve body and valve seat hole and the like. As a result, the small, low cost fuel pump 1 capable of controlling the discharge amount and discharge pressure can be provided.

Figure 5A:
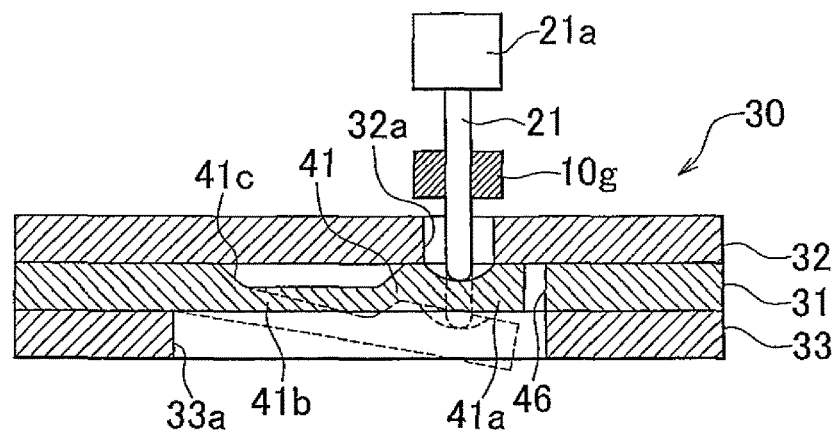
FIG. 5A is a sectional view of an intake valve portion of a valve unit of a fuel pump according to a second example embodiment of the invention.
Figure 5B:
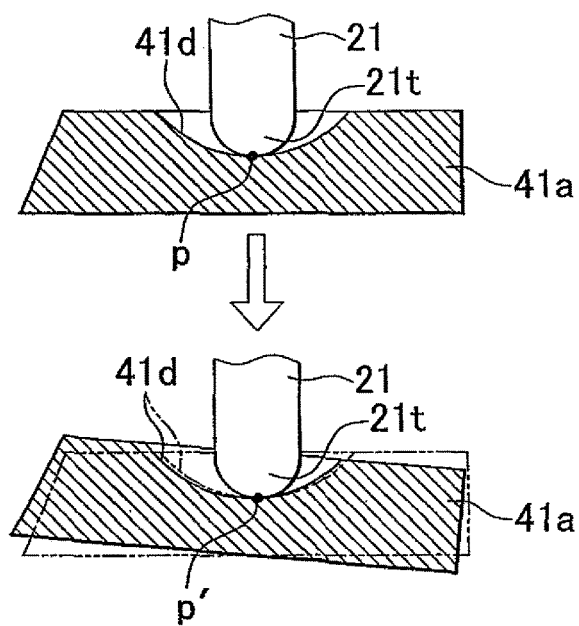
FIG. 5B is an enlarged view of a valve tip end portion that shows the change in the state in the intake valve portion in FIG. 5A from when the valve is closed to when the valve is open.

FIGS. 5A and 5B are sectional views of the main portion of a fuel pump according to a second example embodiment of the invention.

Incidentally, in the example embodiments described hereinafter, the overall structure is generally the same as that described in the first example embodiment described above, only a portion of the valve unit 30 is different. Therefore, common or similar constituent elements will be denoted by the reference characters of the corresponding constituent elements shown in FIGS. 1 to 4, and only the differences will be described in detail.

As shown in FIG. 5A, in this example embodiment, the first reed valve body 41 formed in the valve plate 31 of the valve unit 30 has a concave surface 41d, the cross section of which is curved in an arc shape, formed on the valve body portion 41a (i.e., the operated portion) that receives the operating force from the operating member 21. Also, the operating member 21 is slidably guided in the axial direction by a guide ring portion 10g that is mounted at the tip end side of the operating member 21 to the inside of the pump housing 10.

The concave surface 41d may form part of a cylindrical surface or a spherical surface, for example, and may be a concave surface resembling either of the two. The valve body portion 41a where the concave surface 41d is formed has a constant curvature radius that is larger than the curvature radius of the tip end portion 21t of the operating member 21, such that the point of contact p with the semispherical tip end portion 21t of the operating member 21 is located on the innermost side of the concave surface 41d in the axial direction (i.e., the operating direction) of the operating member 21.

Accordingly, as shown in FIG. 5B, even when the first reed valve body 41 receives the operating force from the operating member 21 and flexes in the valve opening direction such that the valve body portion 41a of the first reed valve body 41 slants with respect to the operating member 21, as shown in the lower part of the drawing, the valve body portion 41a receives the operating force from the operating member 21 at the point of contact p' where the point of contact p with the semispherical tip end portion 21t of the operating member 21 is located on the innermost side of the concave surface 41d in the axial direction of the operating member 21.

Like the first example embodiment described above, this example embodiment also makes it possible to provide a small, low cost fuel pump 1 that consolidates functions by housing the relief valve 16 in addition to the intake valve 12 and the discharge valve 14 in the pump housing 10, and that is capable of controlling the discharge amount and the discharge pressure by variably controlling the duration during which the first reed valve body 41 is closed by the operating member 21 of the electromagnetic operating unit 25.

Moreover, in this example embodiment, it is possible to effectively suppress lateral force that acts to offset the operating member 21 in a direction orthogonal to the operating direction when the first reed valve body 41 of the intake valve 12 flexes from the operating force from the operating member 21. As a result, the operating precision and operating stability of the first reed valve body 41 by the operating member 21 is able to be ensured, so the reliability of the fuel pump 1 can be increased.

Figure 6A:
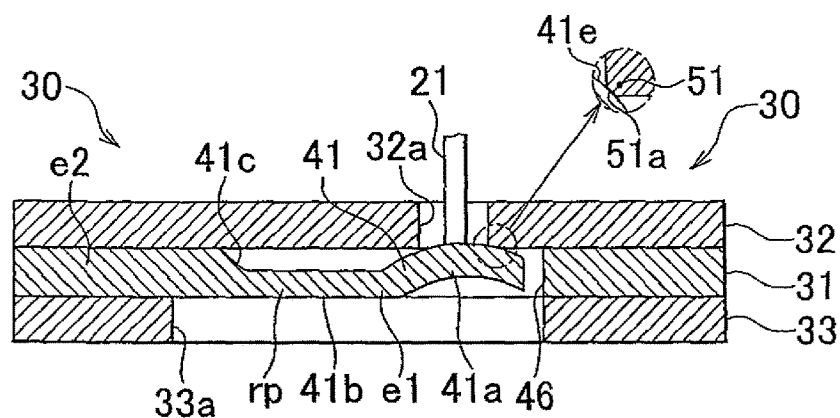
FIG. 6A is a sectional view of an intake valve portion of a valve unit of a fuel pump according to a third example embodiment of the invention.
Figure 6B:
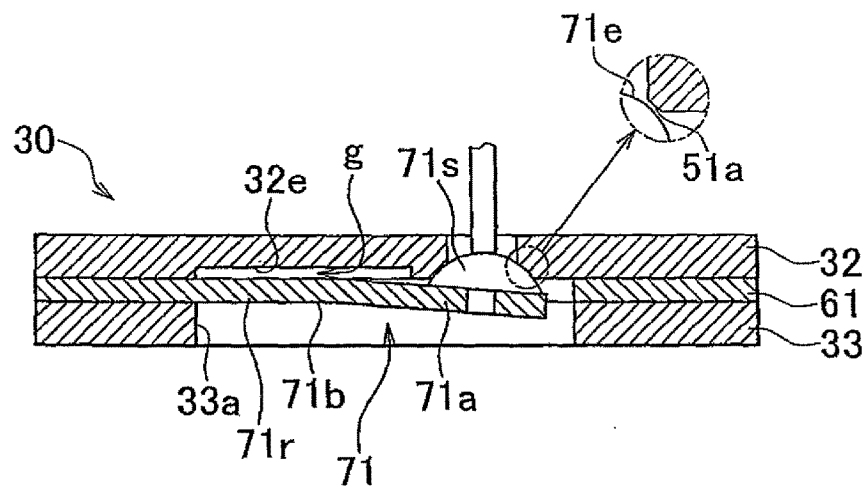
FIG. 6B is a sectional view of an intake valve portion of a valve unit of a fuel pump according to a fourth example embodiment of the invention.

FIG. 6A is a sectional view of a main portion of a fuel pump according to a third example embodiment of the invention, and FIG. 6B is a sectional view of a main portion of a fuel pump according to a fourth example embodiment of the invention.

As shown in FIG. 6A, in the third example embodiment, the valve body portion 41a of the first reed valve body 41 formed in the valve plate 31 of the valve unit 30 is formed in a convex spheroidal shape in which the surface portion has a generally arc-shaped cross-section.

That is, the first valve seat portion 51 that surrounds part of the intake side fuel passage 11a is formed on the one seat plate 32 in the pump housing 10, and a conically-shaped annular seat surface 51a is formed on this first valve seat portion 51. Also, similar to the first example embodiment described above, the first reed valve body 41 has a valve body portion 41a that opens part of the fuel passage 11a by being displaced in a valve opening direction in which it moves away from the first valve seat portion 51, and closes part of the fuel passage 11a by being displaced in a valve closing direction in which it engages with the first valve seat portion 51, and a flexible arm portion 41b that has one end portion e1 that is connected to this valve body portion 41a and another end portion e2 that is supported by the pump housing 10. However, in this example embodiment, the valve body portion 41a of the first reed valve body 41 forms an annular sloped surface 41e that slopes in a generally conical shape and forms a convex shape in the valve closing direction toward the first valve seat portion 51. Therefore, even when intake valve 12 is closed, at which time the valve body portion 41a of the first reed valve body 41 is engaged with the first valve seat portion 51, the valve body portion 41a is urged against the first valve seat portion 51 with the flexible atm portion 41b being flexed (with bending stress occurring), so the necessary set load is ensured.

Therefore, in this third example embodiment, in addition to the effects of the first example embodiment described above, the intake valve 12 is able to be reliably closed so stable valve operation can be obtained. Further, the first reed valve body 41 and the first valve seat portion 51 are placed in a contact state close to linear contact in a ring shape so seal surface pressure can easily be ensured. As a result, a good seal of the intake valve 12 can be stably ensured.

As shown in FIG. 6B, in the fourth example embodiment, a valve plate 61 formed of precipitation hardened, extremely elastic stainless plate is provided, instead of the valve plate 31 in the example embodiments described above, in the valve unit 30. A reed portion 71r (a tongue-shaped portion; a plate spring member) of a first reel valve body 71 that has the same profile shape as the first reed valve body 41, the second reed valve body 42, and the third reed valve body 43 in the example embodiments described above, and the like is formed in this valve plate 61.

Also, a rivet-shaped fixing member 71s formed in a convex shape in which the surface portion has a generally arc-shaped or generally conically-shaped cross-section is fixed by crimping, for example, to the reed portion 71r or the reed portion 71r and reed portions of second and third reed valve bodies, not shown. The surface portion 71e of this fixing member 71s that engages with the first valve seat portion 51 has a convex spheroidal shape with a generally arc-shaped cross-section.

Moreover, a convex portion 32e that opens toward the first reed valve body 71 is formed on the one seat plate 32 such that a gap g is formed between the one seat plate 32 and the flexible arm portion 71b of the first reed valve body 71.

In this example embodiment as well, substantially similar effects as those obtained with the third example embodiment can be obtained. Further, extremely durable plate spring material can be used for the flexible arm portion 71b of the first reed valve body 71 and the like. Clearly separating the functions of the valve body portion 71a of the first reed valve body 71 and the flexible arm portion 71b of the first reed valve body 71 in terms of material in this way enables the durability of the intake valve 12 and the seal when the intake valve 12 is closed to be improved.

Moreover, the concave portion 32e that opens toward the first reed valve body 71 is formed on the one seat plate 32, so fretting wear can be prevented even if a concave portion is not provided on the first reed valve body 71 side. Thus, the first reed valve body 71 is easy to manufacture so costs can be reduced.

Figure 7A:
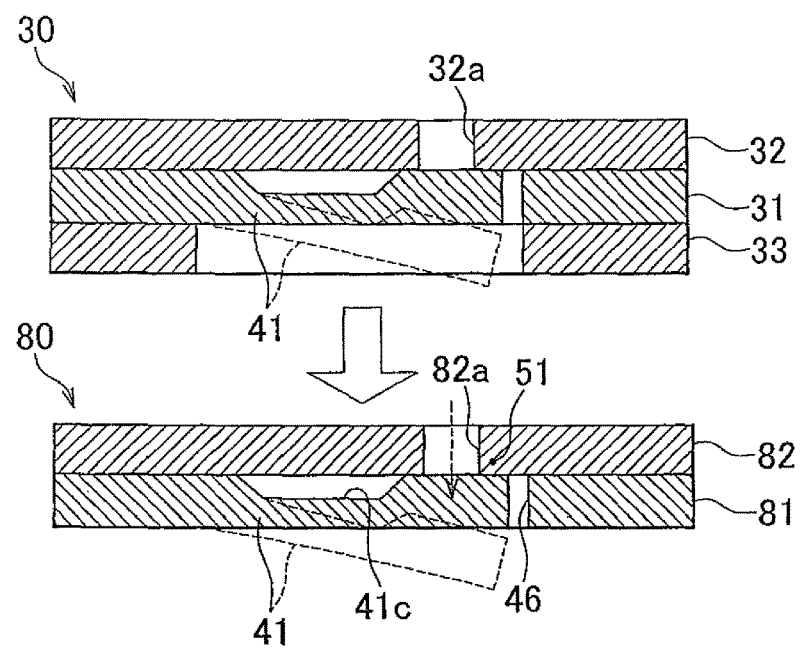
FIG. 7A is a sectional view of an intake valve portion of a valve unit of a fuel pump according to a fifth example embodiment of the invention.
Figure 7B:
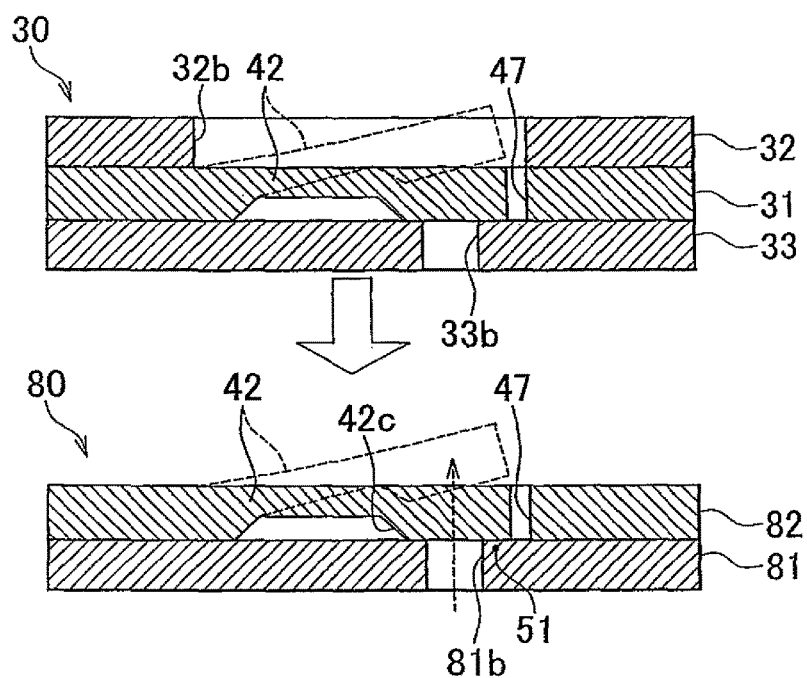
FIG. 7B is a sectional view of a discharge valve portion of the valve unit of the fuel pump according to the fifth example embodiment of the invention.

FIGS. 7A and 7B are sectional views of a main portion of a fuel pump according to a fifth example embodiment of the invention.

The valve unit 30 in the first example embodiment described above shown in the upper portions of FIGS. 7A and 7B is formed with three layers, i.e., the valve plate 31, the one seat plate 32 on one surface side of the valve plate 31, and the other seat plate 33 on the other surface side of the valve plate 31. In the fifth example embodiment, however, the valve unit 30 is formed with two layers.

That is, in a valve unit 80 of this example embodiment shown in the lower portions of FIGS. 7A and 7B, a first elastic plate 81 and a second elastic plate 82 that are formed of the same material as the valve plate 31 described above and face each other are housed in the pump housing 10.

Similar to the first example embodiment, the intake valve 12 is formed by the first reed valve body 41 that is arranged in the intake side fuel passage 11a of the fuel pressurizing chamber 15, and the discharge valve 14 is formed by the second reed valve body 42 that is arranged in the discharge side fuel passage 11b of the fuel pressurizing chamber 15.

However, of the first reed valve body 41 and the second reed valve body 42, one of the reed valve bodies, such as the first reed valve body 41, is formed by a part of the first elastic plate 81 that has been partially cut out, and a passage hole 81b that is part of the discharge side fuel passage 11b corresponding to the other reed valve body (either the first reed valve body 41 or the second reed valve body 42, whichever is remaining), such as the second reed valve body 42, is formed by a part of the first elastic plate 81 that has been cut out. A passage hole 82a that is part of the intake side fuel passage 11a corresponding to the first reed valve body 41 is formed by a part of the second elastic plate 82 that has been cut out, and the second reed valve body 42 is formed by a part of the second elastic plate 82 that has been partially cut out.

In this example embodiment, even if the valve opening directions of the first reed valve body 41 and the second reed valve body 42 (i.e., the valve opening directions of a plurality of reed valves) differ from one another, the first reed valve body 41 and the second reed valve body 42, and the first valve seat portion 51 and the second valve seat portion 52, can be easily formed on the two layers of elastic plates, i.e., first elastic plate 81 and the second elastic plate 82, so the thin valve unit 80 can be realized.

Figure 8A:
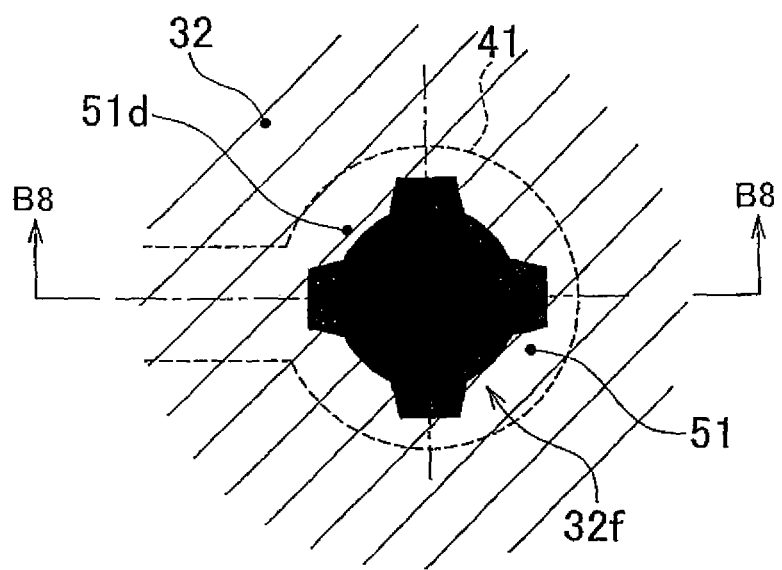
FIG. 8A is a sectional view of a valve seat hole shape of an intake valve portion of a valve unit of a fuel pump according to a sixth example embodiment of the invention.
Figure 8B:
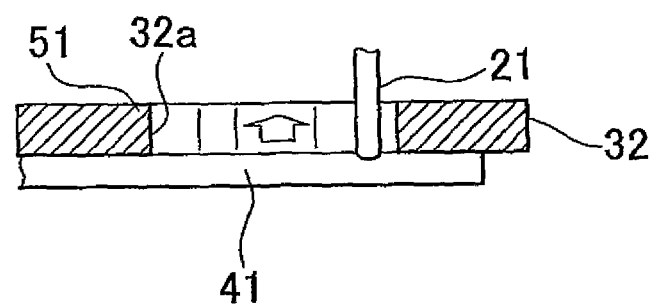
FIG. 8B is a sectional view taken along line B8-B8 in FIG. 8A.

FIGS. 8A and 8B are sectional views of a valve seat hole shape of an intake valve portion of a valve unit of a fuel pump according to a sixth example embodiment of the invention.

In this example embodiment, instead of the passage hole 32a of the one seat plate 32 that is part of the intake side fuel passage 11a of the fuel pressurizing chamber 15 in the fuel pump 1 in the first example embodiment, a passage hole 32f that has four expanded portions at 90 degree intervals is formed and the first valve seat portion 51 around the passage hole 32f has four inward facing convex portions 51d, as shown in FIG. 8A. Part of the operating member 21 is housed in one of the four expanded portions of the passage hole 32f.

In addition to the effects of the first example embodiment, with this example embodiment, the four inward facing convex portions 51d of the first valve seat portion 51 are able to effectively suppress the valve body portion 41a of the first reed valve body 41 from deforming when the pressure rises in the fuel pressurizing chamber 15, so wear of the first reed valve body 41 can be suppressed.

Figure 9A:
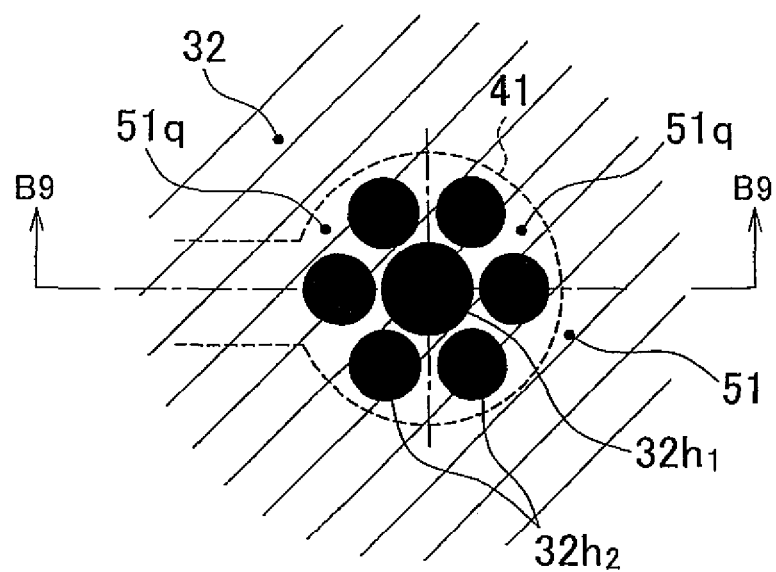
FIG. 9A is a sectional view of a valve seat hole shape of an intake valve portion of a valve unit of a fuel pump according to a seventh example embodiment of the invention.
Figure 9B:
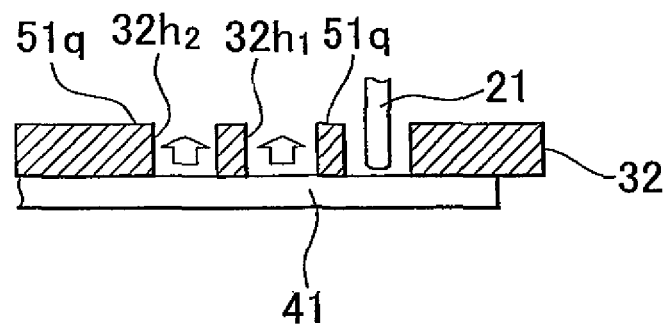
FIG. 9B is a sectional view taken along line B9-B9 in FIG. 9A.

FIGS. 9A and 9B are sectional views of a valve seat hole shape of an intake valve portion of a valve unit of a fuel pump according to a seventh example embodiment of the invention.

In this example embodiment, instead of the passage hole 32a of the one seat plate 32 that forms part of the intake side fuel passage 11a of the fuel pressurizing chamber 15 in the fuel pump 1 in the first example embodiment, a center portion circular first passage hole 32h1 and a plurality of circular second passage holes 32h2 around that first passage hole 32h1 are formed and the first valve seat portion 51 is spread out among a plurality of small valve seat portions 51q that individually surround the first and second passage holes 32h1 and 32h2, as shown in FIG. 9A.

In addition to the effects of the first example embodiment, with this example embodiment, the plurality of small valve seat portions 51q of the first valve seat portion 51 are able to effectively suppress the valve body portion 41a of the first reed valve body 41 from deforming when the pressure in the fuel pressurizing chamber 15 rises, so wear of the first reed valve body 41 can be suppressed.

Figure 10A:
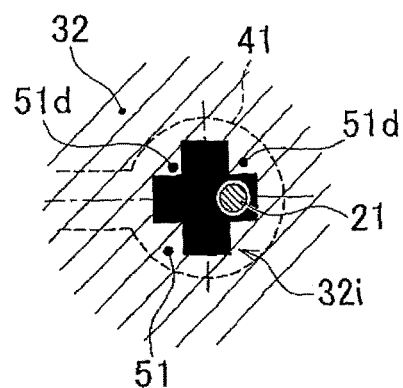
FIG. 10A is a sectional view of a valve seat hole shape of an intake valve portion or a discharge valve portion of a valve unit of a fuel pump according to an eighth example embodiment of the invention.
Figure 10B:
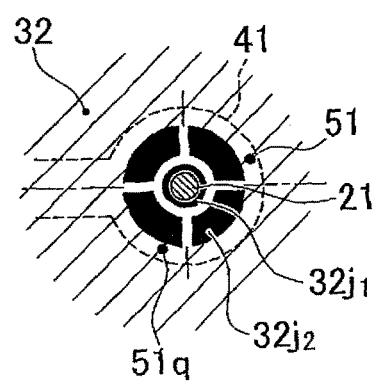
FIG. 10B is a sectional view of a valve seat hole shape of an intake valve portion or a discharge valve portion of a valve unit of a fuel pump according to a ninth example embodiment of the invention.
Figure 10C:
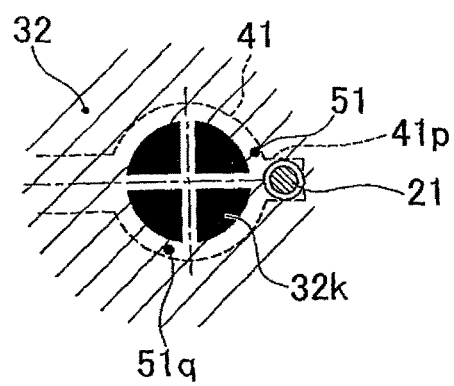
FIG. 10C is a sectional view of a valve seat hole shape of an intake valve portion or a discharge valve portion of a valve unit of a fuel pump according to a tenth example embodiment of the invention.
Figure 10D:
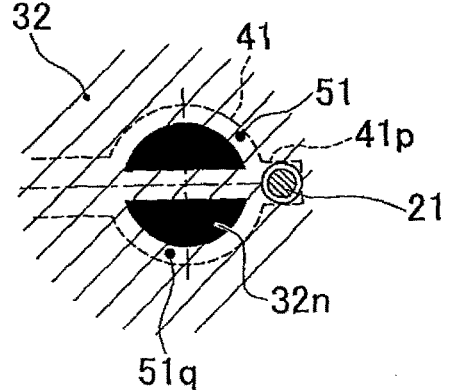
FIG. 10D is a sectional view of a valve seat hole shape of an intake valve portion or a discharge valve portion of a valve unit of a fuel pump according to an eleventh example embodiment of the invention.

FIG. 10A is a sectional view of a valve seat hole shape of an intake valve portion of a valve unit of a fuel pump according to an eighth example embodiment of the invention, and FIG. 10B is a sectional view of a valve seat hole shape of an intake valve portion of a valve unit of a fuel pump according to a ninth example embodiment of the invention. FIG. 10C is a sectional view of a valve seat hole shape of an intake valve portion of a valve unit of a fuel pump according to a tenth example embodiment of the invention, and FIG. 10D is a sectional view of a valve seat hole shape of an intake valve portion of a valve unit of a fuel pump according to an eleventh example embodiment of the invention.

In the eighth example embodiment shown in FIG. 10A, instead of the passage hole 32a of the one seat plate 32 that forms part of the intake side fuel passage 11a of the fuel pressurizing chamber 15 in the fuel pump 1 in the first example embodiment, a generally cross-shaped passage hole 32i is formed and the first valve seat portion 51 has four inward convex portions 51d around this passage hole 32i, as shown in the drawing.

In addition to the effects of the first example embodiment, with this example embodiment, the plurality of convex portions 51d of the first valve seat portion 51 are able to effectively suppress the valve body portion 41a of the first reed valve body 41 from deforming when the pressure in the fuel pressurizing chamber 15 rises, so wear of the first reed valve body 41 can be suppressed.

In the ninth example embodiment shown in FIG. 10B, instead of the passage hole 32a of the one seat plate 32 that forms part of the intake side fuel passage 11a of the fuel pressurizing chamber 15 in the fuel pump 1 in the first example embodiment, a center portion circular passage hole 32j1 and four arc-shaped passage holes 32j2 around the center portion circular passage hole 32j1 are formed and the first valve seat portion 51 is spread out among a plurality of small valve seat portions 51q that surround these first and second passage holes 32j1 and 32j2, as shown in the drawing.

In addition to the effects of the first example embodiment, with this example embodiment, the plurality of small valve seat portions 51q of the first valve seat portion 51 are able to effectively suppress the valve body portion 41a of the first reed valve body 41 from deforming when the pressure rises in the fuel pressurizing chamber 15.

In the tenth example embodiment shown in FIG. 10C, instead of the passage hole 32a of the one seat plate 32 that forms part of the intake side fuel passage 11a of the fuel pressurizing chamber 15 in the fuel pump 1 in the first example embodiment, four fan-shaped passage holes 32k are formed and the first valve seat portion 51 is spread out among a plurality of small valve seat portions 51q that surround these passage holes 32k, as shown in the drawing.

Also, the first reed valve body 41 has an operating end portion 41p that extends toward the tip end side from the valve body portion 41a. The operating load from the operating member 21 is applied to this operating end portion 41p.

In addition to the effects of the first example embodiment, with this example embodiment, the plurality of small valve seat portions 51q of the first valve seat portion 51 are able to effectively suppress the valve body portion 41a of the first reed valve body 41 from deforming when the pressure in the fuel pressurizing chamber 15 rises. Moreover, the first reed valve body 41 has the operating end portion 41p that extends toward the tip end side from the valve body portion 41a, so the operating force of the operating member 21 can be reduced.

In the eleventh example embodiment shown in FIG. 10D, instead of the passage hole 32a of the one seat plate 32 that forms part of the intake side fuel passage 11a of the fuel pressurizing chamber 15 in the fuel pump 1 in the first example embodiment, two semicircular passage holes 32n are formed and the first valve seat portion 51 is spread out among a plurality of small valve seat portions 51q that surround these passage holes 32n, as shown in the drawing.

Also, the first reed valve body 41 has an operating end portion 41p that extends toward the tip end side from the valve body portion 41a. The operating load from the operating member 21 is applied to this operating end portion 41p.

In addition to the effects of the first example embodiment, with this example embodiment, the plurality of small valve seat portions 51q of the first valve seat portion 51 are able to effectively suppress the valve body portion 41a of the first reed valve body 41 from deforming when the pressure in the fuel pressurizing chamber 15 rises. Moreover, the first reed valve body 41 has the operating end portion 41p that extends toward the tip end side from the valve body portion 41a, so the operating force of the operating member 21 can be reduced.

Figure 11A:
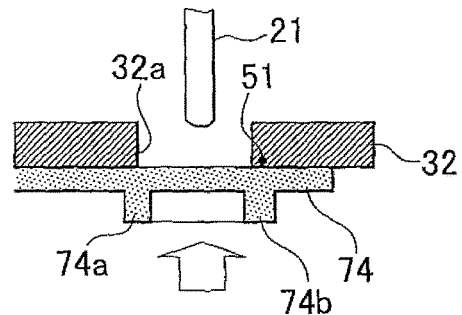
FIG. 11A is a sectional view of a reed valve body shape of an intake valve portion of a valve unit of a fuel pump according to a twelfth example embodiment of the invention.
Figure 11B:
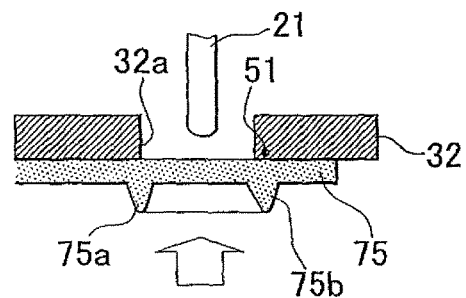
FIG. 11B is a sectional view of a reed valve body shape of an intake valve portion of a valve unit of a fuel pump according to a thirteenth example embodiment of the invention.
Figure 11C:
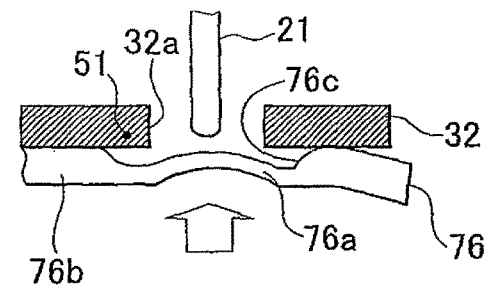
FIG. 11C is a sectional view of a reed valve body shape of an intake valve portion of a valve unit of a fuel pump according to a fourteenth example embodiment of the invention.
Figure 11D:
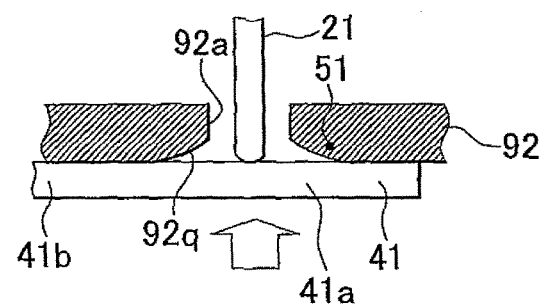
FIG. 11D is a sectional view of a reed valve body shape of an intake valve portion of a valve unit of a fuel pump according to a fifteenth example embodiment of the invention.

FIG. 11A is a sectional view of a reed valve body of an intake valve portion of a valve unit of a fuel pump according to a twelfth example embodiment of the invention, and FIG. 11B is a sectional view of a reed valve body of an intake valve portion of a valve unit of a fuel pump according to a thirteenth example embodiment of the invention. Also, FIG. 11C is a sectional view of a reed valve body of an intake valve portion of a valve unit of a fuel pump according to a fourteenth example embodiment of the invention, and FIG. 11D is a sectional view of a reed valve body of an intake valve portion of a valve unit of a fuel pump according to a fifteenth example embodiment of the invention.

With the twelfth example embodiment shown in FIG. 11A, instead of the first reed valve body 41 of the intake valve 12 (or the second reed valve body 42 of the discharge valve 14 or the third reed valve body 43 of the relief valve 16) of the fuel pump 1 in the first example embodiment, a reed valve body 74 having a reinforced structure is provided.

A valve body portion 74a of this reed valve body 74 has an annular reinforced rib 74b corresponding to the first valve seat portion 51 formed on the one seat plate 32. This reinforced rib 74b has a rectangular cross-section that extends toward both the inside and the outside of the inner peripheral edge portion of the first valve seat portion 51. Also, although not shown, a concave portion that opens toward the reed valve body 74 is formed on the one seat plate 32.

In addition to the effects of the first example embodiment, with this example embodiment, the reinforced rib 74b of the reed valve body 74 is able to effectively suppress the valve body portion 74a of the reed valve body 74 from deforming due to a rise in the pressure in the fuel pressurizing chamber 15, and wear of the reed valve body 74 can be suppressed by the linear contact with the inner peripheral edge portion of the first valve seat portion 51.

In the thirteenth example embodiment shown in FIG. 11B, instead of the first reed valve body 41 of the intake valve 12 in the fuel pump 1 in the first example embodiment, a reed valve body 75 having a reinforced structure is provided.

A reed valve portion 75a of this reed valve body 75 has an annular reinforced rib 75b corresponding to the first valve seat portion 51 formed on the one seat plate 32. This reinforced rib 75b has a triangular cross-section that extends toward both the inside and the outside of the inner peripheral edge portion of the first valve seat portion 51. Also, although not shown, a concave portion that opens toward the reed valve body 75 is formed on the one seat plate 32.

Substantially the same effects as those obtained from the twelfth example embodiment can be expected with this example embodiment.

With the fourteenth example embodiment shown in FIG. 11C, instead of the first reed valve body 41 of the intake valve 12 of the fuel pump 1 of the first example embodiment, a reed valve body 76 having a concave roll off 76c that opens toward the passage hole 32a is provided.

This reed valve body 76 does not contact the inner peripheral edge portion of the first valve seat portion 51 formed on the one seat plate 32 due to the roll off 76c on one side of the valve body portion 76a, but instead contacts the flat surface portion of the first valve seat portion 51 around that inner peripheral edge portion. Also, although not shown, a concave portion that opens toward the reed valve body 76 is formed on the one seat plate 32.

In addition to the effects of the first example embodiment, with this example embodiment, the linear contact with the inner peripheral edge portion of the first valve seat portion 51 makes is possible to prevent the valve body portion 76a of the reed valve body 76 from wearing when the valve body portion 76a of the reed valve body 76 deforms due to a rise in the pressure in the fuel pressurizing chamber 15.

With the fifteenth example embodiment shown in FIG. 11D, instead of the one seat plate 32 of the fuel pump 1 of the first example embodiment, one seat plate 92 that has a passage hole 92a that forms part of the intake side fuel passage 11a is provided.

This one seat plate 92 radially extends the end portion on the fuel pressurizing chamber 15 side of the passage hole 92a and makes the inner peripheral portion of the first valve seat portion 51 an annular wall surface 92q that curves gently with no edge.

In addition to the effects of the first example embodiment, with this example embodiment, even if the valve body portion 41a of the first reed valve body 41 deforms due to a rise in the pressure in the fuel pressurizing chamber 15, it will not make edge contact with the inner peripheral edge portion of the first valve seat portion 51, and the gently curved annular wall surface 92q makes it possible to prevent the valve body portion 41a of the first reed valve body 41 from wearing.

Figure 12A:
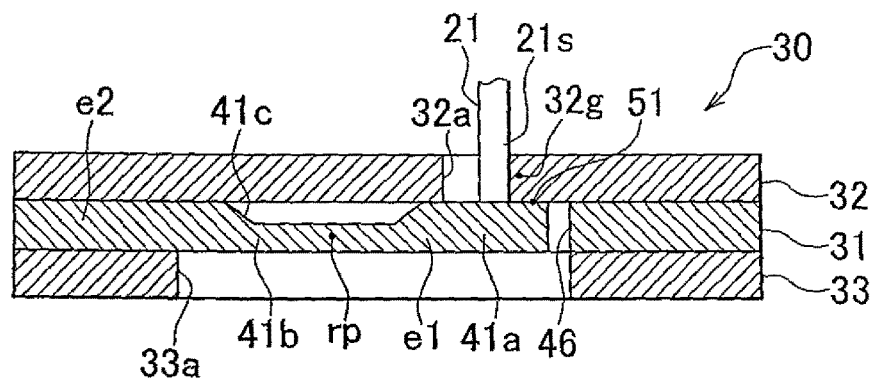
FIG. 12A is a sectional view of an intake valve portion of a valve unit of a fuel pump according to a sixteenth example embodiment of the invention when the intake valve portion is closed.
Figure 12B:
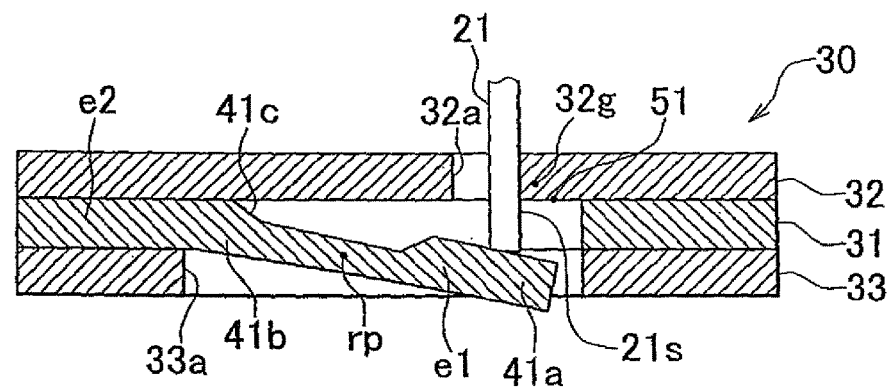
FIG. 12B is a sectional view of the intake valve portion of the valve unit of the fuel pump according to the sixteenth example embodiment when the intake valve portion is open.
Figure 13A:
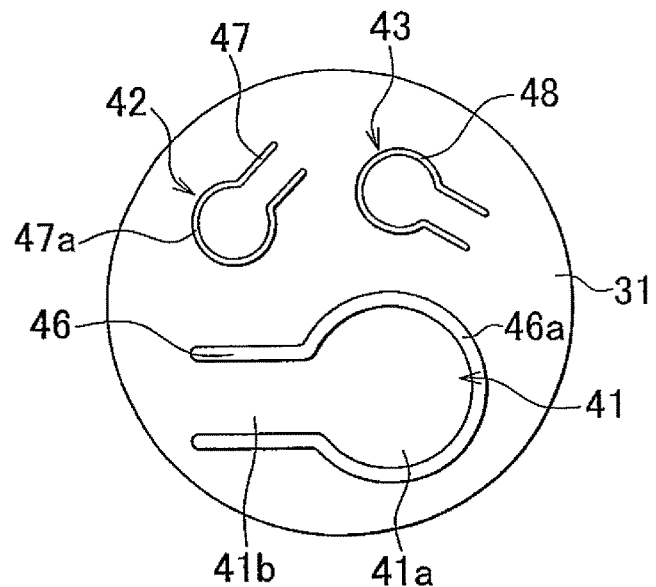
FIG. 13A is a plan view of a valve plate of the valve unit of the fuel pump according to the sixteenth example embodiment.
Figure 13B:
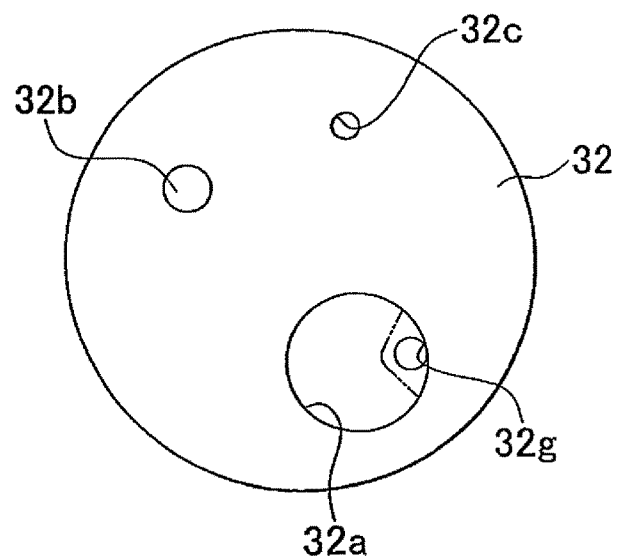
FIG. 13B is a plan view of a seat plate of the valve unit of the fuel pump according to the sixteenth example embodiment.

FIG. 12A is a sectional view of the main portion of an intake valve of a valve unit of a fuel pump according to a sixteenth example embodiment of the invention when the intake valve is closed, and FIG. 12B is a sectional view of the main portion of the intake valve of the valve unit of the fuel pump according to the sixteenth example embodiment when the intake valve is open. Also, FIG. 13A is a plan view of a valve plate of the valve unit of the fuel pump according to the sixteenth example embodiment, and FIG. 13B is a plan view of a seat plate of the valve unit of the fuel pump according to the sixteenth example embodiment.

In this example embodiment, the operating member 21 of the electromagnetic operating unit 25 is offset with respect to the passage hole 32a that forms part of the intake side fuel passage 11a, and the lower end portion of the operating member 21 is guided in the operating direction from the side by an inner wall portion 32g of the passage hole 32a of the one seat plate 32, in the valve unit 30 of the fuel pump 1 of the first example embodiment.

That is, one side surface portion 21s of the operating member 21 that is away from the other end portion e2 of the deforming arm portion 41b of the first reed valve body 41 is guided in the operating direction by the first valve seat portion 51 or the inner wall portion 32g of the passage hole 32a of the one seat plate 32 that functions as a guide member on the pump housing 10 side near the first valve seat portion 51.

Therefore, in this example embodiment, even if the operating member 21 receives force in a direction orthogonal to the operating direction while the first reed valve body 41 is flexed in the valve opening direction as a result of the operating force from the operating member 21 being applied to it, that lateral force is supported by the one seat plate 32 that functions as a guide member that guides the one side surface portion 21s of the operating member 21, so the operating member 21 is able to operate the first reed valve body 41 with a stable operating posture.

Incidentally, as shown in FIG. 13B, the inner wall portion 32g of the passage hole 32a of the one seat plate 32 partially protrudes as shown by the virtual line in the drawing, so it can also serve as a cylindrical guide portion that surrounds the operating member 21 and guides it in the operating direction. That is, the one seat plate 32 may also be modified in this way.

Figure 14A:
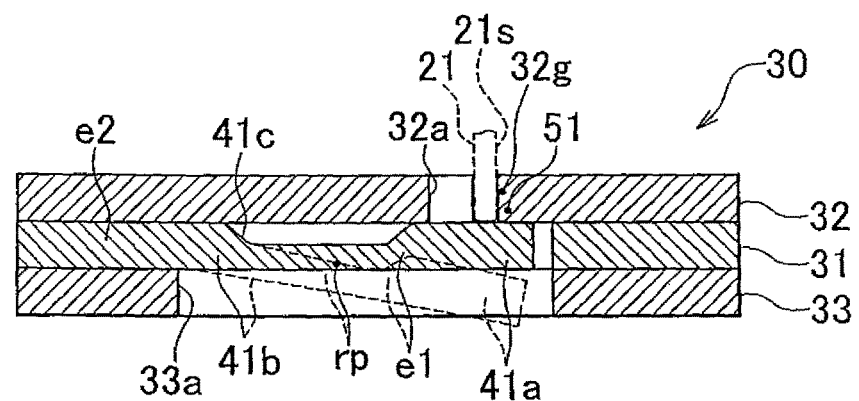
FIG. 14A is a sectional view of an intake valve portion of a valve unit of a fuel pump according to a seventeenth example embodiment of the invention.
Figure 14B:
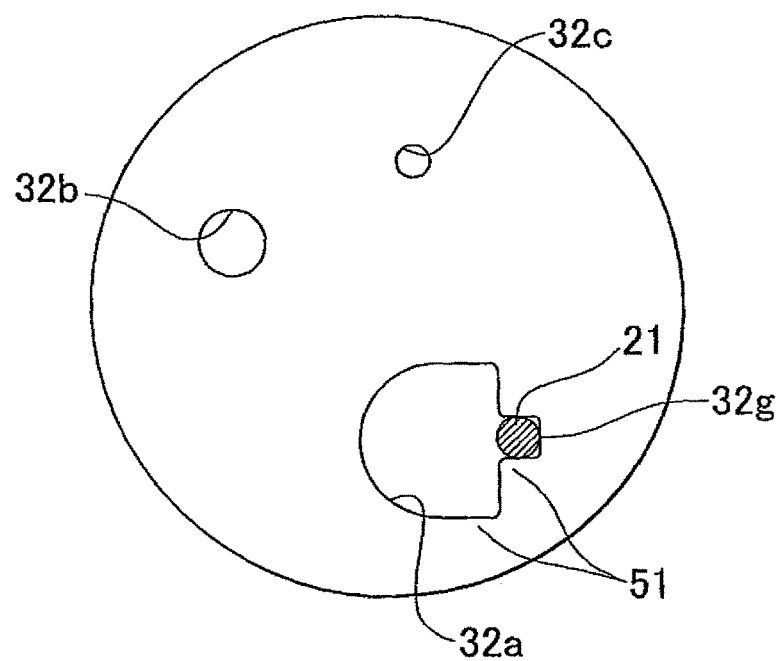
FIG. 14B is a plan view of a seat plate of the valve unit of the fuel pump according to the seventeenth example embodiment.

FIG. 14A is a sectional view of the main portion near an intake valve portion of a valve unit of a fuel pump according to a seventeenth example embodiment of the invention, and FIG. 14B is a plan view of a seat plate of the valve unit of the fuel pump according to the seventeenth example embodiment.

In this example embodiment, in the valve unit 30, the operating member 21 is offset with respect to the passage hole 32a that forms part of the intake side fuel passage 11a, and the lower end portion of the operating member 21 is guided in the operating direction from the side by the inner wall portion 32g of the passage hole 32a of the one seat plate 32, in much the same way as the sixteenth example embodiment.

However, the passage hole 32a of the one seat plate 32 of this example embodiment is not circular as in the first example embodiment, but is a noncircular hole that guides the operating member 21 from three sides by the inner wall portion 32g.

In this example embodiment as well, the one side surface portion 21s of the operating member 21 that is away from the other end portion e2 of the deforming arm portion 41b of the first reed valve body 41 is guided in the operating direction by the inner wall portion 32g of the passage hole 32a of the one seat plate 32 (i.e., the guide member on the pump housing 10 side near the first valve seat portion 51).

Accordingly, in this example embodiment as well, even if the operating member 21 receives force in a direction orthogonal to the operating direction while the first reed valve body 41 is flexed in the valve opening direction as a result of operating force from the operating member 21 being applied to it, that lateral force is supported by the one seat plate 32 that functions as a guide member that guides the one side surface portion 21s of the operating member 21, so the operating member 21 is able to operate the first reed valve body 41 with a stable operating posture.

Figure 15A:
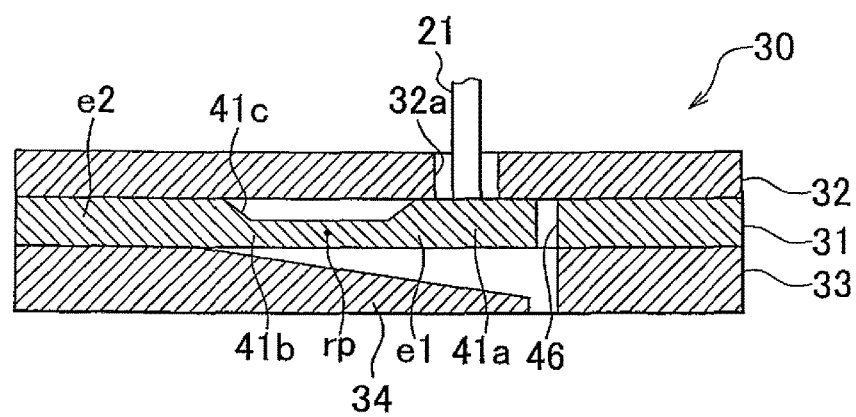
FIG. 15A is a sectional view of an intake valve portion of a valve unit of a fuel pump according to an eighteenth example embodiment of the invention when the intake valve portion is closed.
Figure 15B:
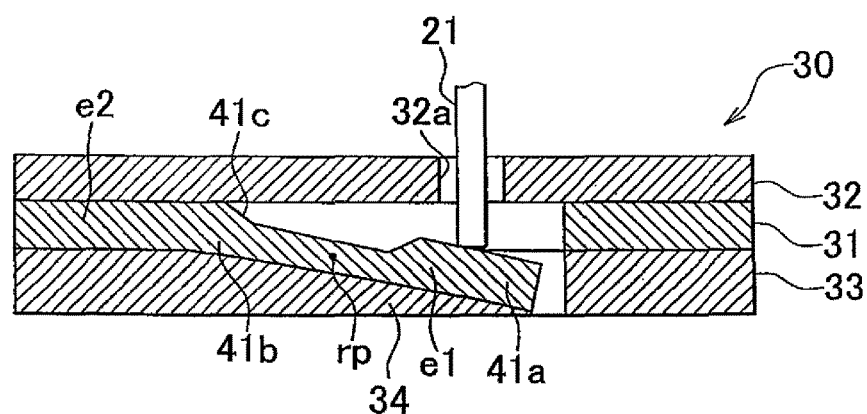
FIG. 15B is a sectional view of the intake valve portion of the valve unit of the fuel pump according to the eighteenth example embodiment when the intake valve portion is open.

FIG. 15A is a sectional view of an intake valve portion of a valve unit of a fuel pump according to an eighteenth example embodiment of the invention when the intake valve portion is closed, and FIG. 15B is a sectional view of the intake valve portion of the valve unit of the fuel pump according to the eighteenth example embodiment when the intake valve portion is open.

In each case of the first example embodiment to the seventeenth example embodiment, there is not provided with a special member to restrict a stroke of the first reed valve body 41. In the eighteenth example embodiment, however, there is provided with a stopper 34 which closes a part of the passage hole 33a disposed in the center portion of the other seat plate 33 and restricts the stroke of the first reed valve body 41. The stopper 34 prevents the first reed valve body 41 from displacing too much. It can be prevented that a stress on a bending portion of the flexible arm portion 41b becomes too large due to too much bending of the first reed valve body.

Incidentally, in each of the example embodiments described above, the first reed valve body 41 that forms the intake valve 12 is operated by the direct operated operating member 21, but the reed valve body may also be operated by an operating member shaped like a rotating cam or lever. Also, when there is another control valve, other than the intake valve, arranged near the fuel pressurizing chamber 15, the valve structure in which the reed valve body is operated by the operating member may also be applied to that control valve.

Also, in each of the example embodiments described above, the relief valve 16 does not have a thin portion on the flexible arm portion of the third reed valve body 43, and thus has relatively high bending rigidity. However, a spring element that serves as auxiliary urging means in the valve closing direction may also be provided near the passage hole 33c of the other seat plate 33 so that the high set pressure of the relief valve 16 can be easily reached without the bending rigidity of the third reed valve body 43 having to be that large. Furthermore, in the example embodiments described above, the engine is a gasoline engine, but the invention may also be applied to a fuel pump of an engine that uses another type of fuel, such as a fuel pump of a diesel engine, for example.

As described above, the fuel pump of the invention is able to be a small fuel pump that is cable of controlling the discharge amount and discharge pressure by providing the reed valve body and the operating member that operates this reed valve body. In addition, there is no need to manufacture a high precision poppet valve body and valve seat hole and the like. As a result, a small, low cost fuel pump capable of controlling the discharge amount and discharge pressure can be provided. The fuel pump of the invention is useful as a general fuel pump, or more particularly, a plunger pump, that pressurizes fuel for an internal combustion engine to high pressure and then discharges that fuel, and has a valve that controls the flow and pressure of fuel provided near a pressurizing chamber of the fuel pump.

The invention claimed is:

1. A fuel pump comprising:
a pump housing that has a first fuel passage and a second fuel passage;
a plunger that is movably housed in the pump housing;
a fuel pressurizing chamber that is formed in the pump housing and draws in fuel via the first fuel passage that is on an intake side of the fuel pressurizing chamber, pressurizes the fuel that has been drawn in, and discharges the pressurized fuel via the second fuel passage that is on a discharge side of the fuel pressurizing chamber, in response to movement of the plunger; and
valve elements arranged in the first fuel passage and the second fuel passage near the fuel pressurizing chamber, wherein:
the valve elements include a first reed valve body arranged in the first fuel passage on the intake side of the fuel pressurizing chamber and a second reed valve body arranged in the second fuel passage on the discharge side of the fuel pressurizing chamber;
the first reed body comprises a valve body portion, and a flexible arm portion that has one end portion that is connected to the valve body portion and another end portion opposite to the one end portion in a first direction that is supported by the pump housing, the flexible arm portion comprising a thin portion that is thinner in a displacement direction of the valve body portion than the valve body portion and that extends an entire width of the flexible arm portion in a second direction perpendicular to the first direction;
the first reed body further comprises a concave portion adjacent to the flexible arm portion and forming a gap between a first plate that is adjacent to one side surface of a second plate on which the first reed valve body is formed and the thin portion of the flexible arm portion of the first reed valve body;
a variably controlled operating member that applies operating force, in at least one of a valve opening direction or a valve closing direction to the first reed valve body is provided in the pump housing;

an electromagnetic operating unit configured to operate the operating member to cause the operating member to move in the first fuel passage in the valve opening direction or the valve closing direction; and the electromagnetic operating unit is configured to variably control a period during which the first reed valve body is closed by the variably controlled operating member in response to movement of the plunger.

2. The fuel pump according to claim 1, wherein:
the valve body portion opens part of the first fuel passage by being displaced in the valve opening direction and closes part of the first fuel passage by being displaced in the valve closing direction.

3. The fuel pump according to claim 2, wherein:
the concave portion opens toward a seat plate that is adjacent to one surface side of a valve plate formed of an elastic plate, such that the gap is formed between the seat plate and the flexible arm portion of the first reed valve body; and the first plate is the seat plate and the second plate is the valve plate.

4. The fuel pump according to claim 2, wherein:
a valve seat portion that surrounds a portion of the first fuel passage and the second fuel passage is provided inside the pump housing; and one side surface portion of the operating member that is away from the other end portion of the flexible arm portion is guided in the operating direction by the valve seat portion or a guide member on the pump housing side near the valve seat portion.

5. The fuel pump according to claim 1 wherein:
a valve plate formed of an elastic plate and a seat plate that is adjacent to one surface side of the valve plate are housed inside the pump housing;

the first plate is the seat plate and the second plate is the valve plate; and the first reed valve body is formed by a part of the valve plate that has been partially cut out, and parts of the first fuel passage and the second fuel passage are formed by cutaway portions in the seat plate.

6. The fuel pump according to claim 5, wherein:
the first reed valve body and the second reed valve body are each formed by a part of the valve plate that has been partially cut out; and a part of the first fuel passage on the intake side of the fuel pressurizing chamber and a part of the second fuel passage on the discharge side of the fuel pressurizing chamber are each formed by a cutaway portion in the seat plate.

7. The fuel pump according to claim 6, wherein:
a third reed valve body that opens one of the first fuel passage and the second fuel passage by being displaced in the valve opening direction and that closes the one of the first fuel passage and the second fuel passage by being displaced in the valve closing direction is formed, separate from the first reed valve body and the second reed valve body, by a part of the valve plate that has been partially cut out; and the third reed valve body is closer to the first reed valve body arranged in the first fuel passage than to the second reed valve body or is closer to the second reed valve body arranged in the second fuel passage than to the first reed valve body.

8. The fuel pump according to claim 7, wherein:
the first reed valve body forms an intake valve that has a check valve function and is arranged in the first fuel passage on the intake side of the fuel pressurizing chamber;

the second reed valve body forms a discharge valve that has a check valve function and is arranged in the second fuel passage on the discharge side of the fuel pressurizing chamber; and the third reed valve body forms a relief valve that is connected to the second fuel passage on the discharge side of the fuel pressurizing chamber.

9. The fuel pump according to claim 5, wherein:
the valve body portion opens part of the first fuel passage by being displaced in the valve opening direction and closes part of the first fuel passage by being displaced in the valve closing direction.

10. The fuel pump according to claim 5, wherein:
the valve body portion opens part of the first fuel passage by being displaced in the valve opening direction and closes part of the first fuel passage by being displaced in the valve closing direction;

a valve seat portion that surrounds a portion of the first fuel passage and the second fuel passage is provided inside the pump housing; and one side surface portion of the operating member that is away from the other end portion of the flexible arm portion is guided in an operating direction by the valve seat portion or a guide member on the pump housing side near the valve seat portion.

11. The fuel pump according to claim 1, wherein:
a concave surface having a cross section that is curved in an arc shape is formed on an operated portion of the first reed valve body that receives the operating force from the operating member; and the first reed valve body is structured such that, when the first reed valve body flexes upon receiving the operating force from the operating member, the first reed valve body receives the operating force from the operating member at a contact point located on the innermost side of the concave surface in a direction of the operating force.

12. The fuel pump according to claim 1, wherein:
a valve seat portion that surrounds a portion of the first fuel passage and the second fuel passage is provided inside the pump housing;

the valve body portion opens part of the first fuel passage by being displaced to so as to move away from the valve seat portion and closes part of the first fuel passage by being displaced so as to engage with the valve seat portion;

the valve body portion forms an annular sloped surface that is sloped in a generally conical shape and forms a convex shape in the valve closing direction toward the valve seat portion; and the valve body portion is configured to be urged against the valve seat portion while the flexible arm portion is flexed, when the valve body portion engages with the valve seat portion.

13. The fuel pump according to claim 1, wherein:
a first elastic plate and a second elastic plate that face one another are housed inside the pump housing;

the first reed valve body arranged in the first fuel passage on the intake side of the fuel pressurizing chamber and part of the second fuel passage are formed by a part of the first elastic plate that has been partially cut out and a cutaway portion in the first elastic plate, respectively; and part of the first fuel passage and the second reed valve body are formed by a cutaway portion in the second elastic plate and a part of the second elastic plate that has been partially cut out, respectively.

14. The fuel pump according to claim 1, wherein the period during which the variably controlled operating member causes the first reed valve body to close corresponds with an amount of time to pressurize and discharge an amount of fuel necessary to compensate for a decrease in the amount of fuel in a delivery pipe downstream of the second fuel passage due to a fuel injection or a drop in the actual fuel pressure caused by the movement of the plunger.

15. A fuel pump comprising:
a pump housing that has a first fuel passage and a second fuel passage;
a plunger that is movably housed in the pump housing;
a fuel pressurizing chamber that is formed in the pump housing and draws in fuel via the first fuel passage that is on an intake side of the fuel pressurizing chamber, pressurizes the fuel that has been drawn in, and discharges the pressurized fuel via the second fuel passage that is on a discharge side of the fuel pressurizing chamber, in response to movement of the plunger; and
valve elements arranged in the first fuel passage and the second fuel passage near the fuel pressurizing chamber, wherein:
the valve elements include a first reed valve body arranged in the first fuel passage on the intake side of the fuel pressurizing chamber and a second reed valve body arranged in the second fuel passage on the discharge side of the fuel pressurizing chamber;
the first reed body comprises a valve body portion, and a flexible arm portion that has one end portion that is connected to the valve body portion and another end portion that is supported by the pump housing;
the first reed valve body is formed from a plate spring member that forms the flexible arm portion and part of the valve body portion that is integrally formed with the flexible arm portion, the first reed valve body further comprising a fixing member that is fixed to the plate spring member and forms the remaining portion of the valve body portion;
a concave portion is formed on a first plate that is adjacent to one side surface of a second plate on which the first reed valve body is formed such that a gap is formed between the first plate and a portion of the first reed valve body;
the fixing member has an annular sloped surface that has a convex spheroidal shape;
a variably controlled operating member that applies operating force, in at least one of a valve opening direction or a valve closing direction to the first reed valve body is provided in the pump housing;
an electromagnetic operating unit configured to operate the operating member to cause the operating member to move in the first fuel passage in the valve opening direction or the valve closing direction; and
the electromagnetic operating unit is configured to variably control a period during which the first reed valve body is closed by the variably controlled operating member in response to movement of the plunger.

16. The fuel pump according to claim 15, wherein:
a valve seat portion that surrounds a portion of the first fuel passage and the second fuel passage is provided inside the pump housing;
the valve body portion opens part of the first fuel passage by being displaced to so as to move away from the valve seat portion and closes part of the first fuel passage by being displaced so as to engage with the valve seat portion;
the valve body portion is configured to be urged against the valve seat portion while the flexible arm portion is flexed, when the valve body portion engages with the valve seat portion; and
the valve seat portion has an annular seat surface corresponding to the annular sloped surface of the valve body portion.

* * * * *